(12) United States Patent
Green et al.

(10) Patent No.: US 8,775,433 B2
(45) Date of Patent: Jul. 8, 2014

(54) SELF-INDEXING DATA STRUCTURE

(75) Inventors: Edward A Green, Englewood, CO (US);
Luis Rivas, Denver, CO (US); Mark Kreider, Arvada, CO (US)

(73) Assignee: Oracle International Corporation, Redwood City, CA (US)

( * ) Notice: Subject to any disclaimer, the term of this patent is extended or adjusted under 35 U.S.C. 154(b) by 696 days.

(21) Appl. No.: 12/580,446

(22) Filed: Oct. 16, 2009

(65) Prior Publication Data

US 2011/0093467 A1 Apr. 21, 2011

(51) Int. Cl.
*G06F 17/30* (2006.01)

(52) U.S. Cl.
USPC .......................................................... 707/741

(58) Field of Classification Search
USPC .......................................................... 707/741
See application file for complete search history.

(56) References Cited

U.S. PATENT DOCUMENTS

| | | | |
|---|---|---|---|
| 7,111,013 B2* | 9/2006 | Federighi et al. | 707/639 |
| 7,225,199 B1* | 5/2007 | Green et al. | 707/999.003 |
| 7,769,772 B2* | 8/2010 | Weyl et al. | 707/765 |
| 7,822,786 B2* | 10/2010 | Charlet et al. | 707/809 |
| 7,840,538 B2* | 11/2010 | Joshi et al. | 707/672 |
| 2003/0061212 A1* | 3/2003 | Smith et al. | 707/999.006 |
| 2010/0131561 A1* | 5/2010 | Lin | 707/791 |

* cited by examiner

*Primary Examiner* — Sathyanarayan Pannala
(74) *Attorney, Agent, or Firm* — Marsh Fischmann & Breyfogle LLP

(57) ABSTRACT

A machine based tool and associated logic and methodology are used in converting data from an input form to a target form using context dependent conversion rules, and in efficiency generating an index that may be utilized to access the converted data in a database. Once the data has been converted, an index data structure for each data object may be automatically generated that encodes one or more characteristics or attributes of the converted data so that an entity may access the data using the index structure. As an example, the one or more characteristics may include categories, subcategories, or other attributes of the data.

18 Claims, 30 Drawing Sheets

STANDARDIZED TRAINING DATA

| PARENT | MFR BRAND NAME | OUNCES | PRODUCT TYPE | PACKAGE | FLAVOR/SCENT | STRENGTH | ADDITIVES | FORM |
|---|---|---|---|---|---|---|---|---|
| NEW DANA PERFUME | ENGLISH LEATHER | 2.5 | ANTIPERSPIRANT DEODORANT | | COOL WAVE | | | |
| PROCTER & GAMBLE | GILLETTE SERIES | 12 | MIXED PRODUCT | PLASTIC WRAPPED PL | ASSORTED | | | ASSORTED |
| PROCTER & GAMBLE | OLD SPICE HIGH ENDURANCE | 9.75 | ASSORTED | PLASTIC WRAPPED PL | ASSORTED | | | ASSORTED |
| BURT'S BEES, INC. | DOCTOR BURTS | 6 | DEODORANT | CAN | HERBAL | REGULAR ST | OIL OF SAGE | PUMP SPRAY |
| UNILEVER | AXE | 3 | DEODORANT | PLASTIC CONTAINER | TOUCH | | | STICK |
| A.P. DEAUVILLE | POWER STICK | 1.69 | DEODORANT | PLASTIC CONTAINER | SPORT | | | STICK |
| PROCTER & GAMBLE | OLD SPICE | 6.5 | DEODORANT | PLASTIC WRAPPED PL | ORIGINAL | | | STICK |
| COLGATE PALMOLIVE | MENNEN SPEED STICK IRISH SPRING | 2.69 | ANTIPERSPIRANT DE | PLASTIC CONTAINER | ICY BLAST | | | STICK |
| COMBE INC | AQUA VELVA ICE SPORT | 2.25 | DEODORANT | PLASTIC CONTAINER | COOLING | | | STICK |
| COLGATE PALMOLIVE | MENNEN SPEED STICK | 3.25 | DEODORANT | PLASTIC CONTAINER | MUSK | | | STICK |
| KISS MY FACE CORP | KISS MY FACE | 2.47 | DEODORANT | PLASTIC BOTTLE | SUMMER | | | STICK |
| HOT LOOKS | KUE | 2.25 | DEODORANT | PLASTIC CONTAINER | REGULAR | REGULAR STRENGTH | | STICK |
| UNILEVER | DEGREE | 6 | DEODORANT | PLASTIC WRAPPED PL | OCEAN BLAST | | | STICK |
| UNILEVER | AXE | 9 | DEODORANT | PLASTIC CONTAINER | ESSENCE | | | STICK |
| COLGATE PALMOLIVE | MENNEN SPEED STICK ULTIMATE | 6 | DEODORANT | PLASTIC WRAPPED PL | POWER SPORT | | | STICK |
| UNILEVER | AXE | 3 | DEODORANT | PLASTIC CONTAINER | KILO | | | STICK |
| A.P. DEAUVILLE | POWER STICK | 2.25 | ANTIPERSPIRANT DE | PLASTIC CONTAINER | MUSK | REGULAR STRENGTH | | STICK |
| ALBA BOTANICA COSN | ALBA BOTANICA | 2.5 | DEODORANT | PLASTIC CONTAINER | UNSCENTED | | ALOE VERA | STICK |
| COLGATE PALMOLIVE | MENNEN SPEED STICK ULTIMATE | 5.39 | ANTIPERSPIRANT DE | PLASTIC WRAPPED PL | ACTIVE FRESH | | | STICK |
| FRED MEYER INC | PERFECT CHOICE | 3.25 | DEODORANT | PLASTIC CONTAINER | REGULAR | | | STICK |
| PROCTER & GAMBLE | OLD SPICE | 2.25 | DEODORANT | PLASTIC CONTAINER | ORIGINAL | | | STICK |
| UNILEVER | DEGREE | 12 | DEODORANT | PLASTIC CONTAINER | SILVER ICE | | | STICK |
| COTY | COTY ADIDAS ACTION 3 TECH | 2.79 | ANTIPERSPIRANT DE | PLASTIC CONTAINER | TEAM FORCE | | | STICK |
| PERCARA ENTERPRIS | PERCARA LADY STICK | 2 | DEODORANT | PLASTIC CONTAINER | SCENTED | | | STICK |
| A.P. DEAUVILLE | POWER STICK | 2.25 | ANTIPERSPIRANT DE | PLASTIC WRAPPED PL | POWER FRESH | REGULAR STRENGTH | | STICK |
| PERSONAL CARE PRO | PERSONAL CARE | 3.25 | DEODORANT | PLASTIC CONTAINER | FRESH SCENT | | | STICK |
| COLGATE PALMOLIVE | MENNEN LADY SPEED STICK | 3 | ANTIPERSPIRANT DE | PLASTIC WRAPPED PL | POWDER FRESH | | | STICK |
| COTY | COTY ADIDAS ACTION 3 TECH | 1.79 | ANTIPERSPIRANT DE | PLASTIC CONTAINER | SPORT FEVER | | | STICK |

FIG. 15

CONTEXT BETWEEN ITEMS, NOT JUST WITHIN AN ITEM

| | |
|---|---|
| OLD SP RD ZN SPRT SOL2.6 | 163147 |
| OLD SPC RED ZONE SPRT2.6Z | 163147 |
| OLD SPC RED ZONE SPORT | 2.6 OZ |
| OLD SPC RED ZONE SPRT SOL | 163147 2.6Z |
| OLD SPC RED ZONE SPRT SOL | (6) 2.6 OZ |
| OLD SPC RED ZONE SPRT SOL | (6) 2.6 OZ |
| O S R/Z SPRT AP DEO 2.6OZ | 163147 |
| OS RED ZONE DAP SPRT DEOD | 2.6 OZ |
| OS RZ PSW/OS 32Z BAR | N 2.6 OZ |
| 2.6 Z LD SPC LDSPC HGH NDRNC RD ZN SLD N | |
| OLD SPC RD ZN SPRT SOL AP | 2.6 OZ |
| OLD SPC RD ZN SPRT A/P DE | 2.6 OZ |
| OS RD ZN SPRT 2.6Z | |
| OLD SPICE HE 2.25OZ ORIGINAL TWN PK | |
| OLD SPICE HE 2.25OZ FRESH TWN PK | |
| OLD SPICE HE 2.25OZ PURE SPT TWN PK | |
| OLD SPICE HE DEOSPORT 2/2.25OZ | |
| OLD SPC HE FRSH | |
| OLD SPICE 3/3.25-OZ | GEL SOLID |

FIG. 17

INDEX VALUE TABLE (BITS 0-2)

ATTRIBUTE → SIZE         INDEX VALUE ($b_{0-2}$)

INDEX VALUE TABLE (BITS 8-10)

ATTRIBUTE → BRAND        INDEX VALUE ($b_{8-10}$)

5220 →
        DIXIE      ────▶  000
        STARBUCKS  ────▶  001            ← 5225
           •                •
           •                •
           •                •
        SOLO       ────▶  111

FIG.22C

SELF-INDEXING DATA STRUCTURE

FIELD OF THE INVENTION

The present invention relates generally to machine-based tools for use in converting data from one form to another and, in particular, to a framework for efficiently generating an index for a data structure that includes the converted data which may be stored in a database.

BACKGROUND OF THE INVENTION

Generally, in database systems, several individual records of data may be stored in tables. Each table may identify fields, or columns, and individual records may be stored as rows, with a data entry in each column. For example, in a parts database, there may be a table "Parts" which includes fields such as part name, part size, part brand, and the like. One record, which includes data in the several columns, would be entered in the Parts table for each part.

One operation that may be performed on database systems is locating specific records within individual tables based on criteria of one or more fields (or columns). The database system may scan through every entry in a particular table to locate the desired records. However, this method may require the database system to scan an entire table which may undesirably consume a considerable amount of time.

To reduce the time required to locate particular records in a database, database indexes may be established. Generally, a database index is a data structure that improves the speed of operations on a database table. Indexes can be created using one or more columns of a database table, providing the basis for both rapid random look ups and efficient access of ordered records. The disk space required to store the index may be less than that required by the table (since indexes usually contain only key-fields according to which the table is to be arranged, and excludes the other details in the table), yielding the possibility to store indexes in memory for a table whose data is too large to store in memory.

When an index is created, it may record the location of values in a table that are associated with the column that is to be indexed. Entries may be added to the index when new data is added to the table. When a query is executed against the database and a condition is specified on a column that is indexed, the index is first searched for the values specified. If the value is found in the index, the index may return the location of the searched data in the table to the entity requesting the query.

SUMMARY OF THE INVENTION

The following embodiments and aspects thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

The present invention is directed to a computer-based tool and associated methodology for transforming electronic information so as to facilitate communications between different semantic environments and access to information across semantic boundaries. More specifically, the present invention is directed to a self-indexing data structure and associated methodology that is automatically generated for data stored in a database. As set forth below, the present invention may be implemented in the context of a system where a semantic metadata model (SMM) for facilitating data transformation. The SMM utilizes contextual information and standardized rules and terminology to improve transformation accuracy. The SMM can be based at least in part on accepted public standards and classification or can be proprietary. Moreover, the SMM can be manually developed by users, e.g., subject matter experts (SMEs) or can be at least partially developed using automated systems, e.g., using logic for inferring elements of the SMM from raw data (e.g., data in its native form) or processed data (e.g., standardized and fully attributed data). The present invention allows for sharing of knowledge developed in this regard so as to facilitate development of a matrix of transformation rules ("transformation rules matrix"). Such a transformation system and the associated knowledge sharing technology are described in turn below.

In a preferred implementation, the invention is applicable with respect to a wide variety of content including sentences, word strings, noun phrases, and abbreviations and can even handle misspellings and idiosyncratic or proprietary descriptors. The invention can also manage content with little or no predefined syntax as well as content conforming to standard syntactic rules. Moreover, the system of the present invention allows for substantially real-time transformation of content and handles bandwidth or content throughputs that support a broad range of practical applications. The invention is applicable to structured content such as business forms or product descriptions as well as to more open content such as information searches outside of a business context. In such applications, the invention provides a system for semantic transformation that works and scales.

The invention has particular application with respect to transformation and searching of both business content and non-business content. For the reasons noted above relating to abbreviation, lack of standardization and the like, transformation and searching of business content presents challenges. At the same time the need for better access to business content and business content transformation is expanding. It has been recognized that business content is generally characterized by a high degree of structure and reusable "chunks" of content. Such chunks generally represent a core idea, attribute or value related to the business content and may be represented by a character, number, alphanumeric string, word, phrase or the like. Moreover, this content can generally be classified relative to a taxonomy defining relationships between terms or items, for example, via a hierarchy such as of family (e.g., hardware), genus (e.g., connectors), species (e.g., bolts), sub-species (e.g., hexagonal), etc.

Non-business content, though typically less structured, is also amenable to normalization and classification. With regard to normalization, terms or chunks with similar potential meanings including standard synonyms, colloquialisms, specialized jargon and the like can be standardized to facilitate a variety of transformation and searching functions. Moreover, such chunks of information can be classified relative to taxonomies defined for various subject matters of interest to further facilitate such transformation and searching functions. Thus, the present invention takes advantage of the noted characteristics to provide a framework by which locale-specific content can be standardized and classified as intermediate steps in the process for transforming the content from a source semantic environment to a target semantic environment and/or searching for information using locale-specific content. Such standardization may encompass linguistics and syntax as well as any other matters that facilitate transformation. The result is that content having little or no syntax is supplied with a standardized syntax that facilitates understanding, the total volume of unique chunks requiring transformation is reduced, ambiguities are resolved and accuracy is commensurately increased and, in general, substantially real-time communication across semantic boundaries is realized. Such classification further serves to resolve ambiguities and facilitate transformation as well as allowing for more efficient searching. For example, the word "butterfly" of the term "butterfly valve" when properly chunked, standardized and associated with tags for identifying a classification relationship, is unlikely to be mishandled. Thus, the system of the present invention does not assume that the input is fixed or static, but recognizes that the input can be made more amenable to transformation and searching, and that such preprocessing is an important key to more fully realizing the potential benefits of globalization. As will be understood from the description below, such standardization and association of attribute fields and field content allows for substantially automatic generation of database indexes having a useful relation to the indexed item of data.

According to one aspect of the present invention, a computer-implemented method for automatically generating an index in a database system is provided. The method includes receiving raw data that includes human directed information (e.g., human readable text strings), and processing the raw data into a standardized format to produce standardized data. The standardized data includes information about an attribute or attribute value of the raw data. For example, the data may be a product and attribute data may include the brand, size, color, or other information about the product. It will be appreciated that the investigation is equally applicable to any data capable of being structured in this regard. In addition, the method includes generating a plurality of identifiers (e.g., index values) for the standardized data based on an attribute or attribute value of the raw data. For example, the identifiers may encode one or more attributes or attribute values of the raw data, such that the data may be accessed more rapidly using the identifiers. The method further includes storing the plurality of identifiers and the standardized data in a data storage structure.

According to another aspect of the present invention, an apparatus for automatically generating an index structure in a database system is provided. The apparatus includes a conversion module operative to receive raw data and to convert the raw data to standardized data comprising a plurality of data objects. Further, the standardized data includes information about an attribute or attribute value of the data objects. The apparatus also includes an index generator module operative to generate a plurality of index values, wherein each of the index values is associated with a data object. Each of the index values encodes an attribute or attribute value of its associated data object. For example, in the case where the data objects are associated with parts in a catalogue, the index value for each part may encode information about the type of part, quantity, size, and the like. Further, the apparatus includes a data storage structure operative to store the plurality of index values and the plurality of data objects.

According to another aspect of the present invention, a method for use in facilitating electronic communication between first and second data systems, wherein the first data system operates in a first semantic environment defined by at least one of linguistics and syntax is provided. The method includes providing a computer-based processing tool operating on a computer system. The method also includes first using the computer-based processing tool to access the communication and convert at least a first term of the communication between the first semantic environment and a second semantic environment that is different from the first semantic environment, and second using the computer-based processing tool to associate a classification with one of the first term and the converted term, the classification identifying the one of the first term and the converted term as belonging to a same class as at least one other term based on a shared characteristic of the at least one other term and the one of the first term and the converted term. Additionally, the method includes third using the classification to automatically generate an identifier for the converted term, and storing the identifier in a data storage structure.

In addition to the exemplary aspects and embodiments described above, further aspects and embodiments will become apparent by reference to the drawings and by study of the following descriptions.

BRIEF DESCRIPTION OF THE DRAWINGS

For a more complete understanding of the present invention and further advantages thereof, reference is now made to the following detailed description taken in conjunction with the drawings, in which:

FIG. 15 is a user interface screen showing standardized training data for use by a self-learning conversion tool in accordance with the present invention;

FIG. 17 is a user interface screen showing a set of product descriptors that can be used to infer context in accordance with the present invention;

FIGS. 22A-C illustrate an exemplary index structure that encodes one or more attributes of data objects in accordance with the present invention;

DETAILED DESCRIPTION

In the following description, some of the examples are set forth in the context of an indexing and search system involving standardization of source and search terms, and the association of classification information with both source terms and search terms and in other conversion contexts. Specific examples are provided in the environment of business information, e.g., searching a website or electronic catalog for products of interest. Although this particular implementation of the invention and this application environment are useful for illustrating the various aspects of the invention, it will be appreciated that the invention is more broadly applicable to a variety of application environments and searching functions. In particular, various aspects of the invention as set forth above may be beneficially used independent of others of these aspects and are not limited to combinative uses as set forth in the discussion that follows.

The discussion below begins by describing, at a functional and system component level, self-indexing systems and methods for data structures that may be stored in a database. This description is contained in Section I, and refers to FIGS. 21-27. Thereafter, in Section II, the underlying framework for term standardization, classification and transformation, and associated search functionality is described in greater detail.

I. Self-Indexing Data Structure System

FIGS. 21-27 illustrate various systems, components, and processes for implementing a self-indexing data structure in accordance with the present invention. Generally, the self-indexing system is operative to convert raw or non-standardized data (e.g., data in its native form from legacy databases or other systems) into normalized data objects, and to automatically generate an index of the data objects that may be used to search or retrieve the normalized data or raw data if desired (e.g., if the raw data may be needed for regulatory compliance or data restoration/archiving). As an example, the index may be structured so as to encode one or more attributes of the data, so that the data may easily be accessed dependent upon a characteristic of the one or more attributes. For example, the data may be placed into a plurality of categories or subcategories based on its attributes, and the data may then be accessed by the categories or sub-categories or contents thereof.

Figure 21:
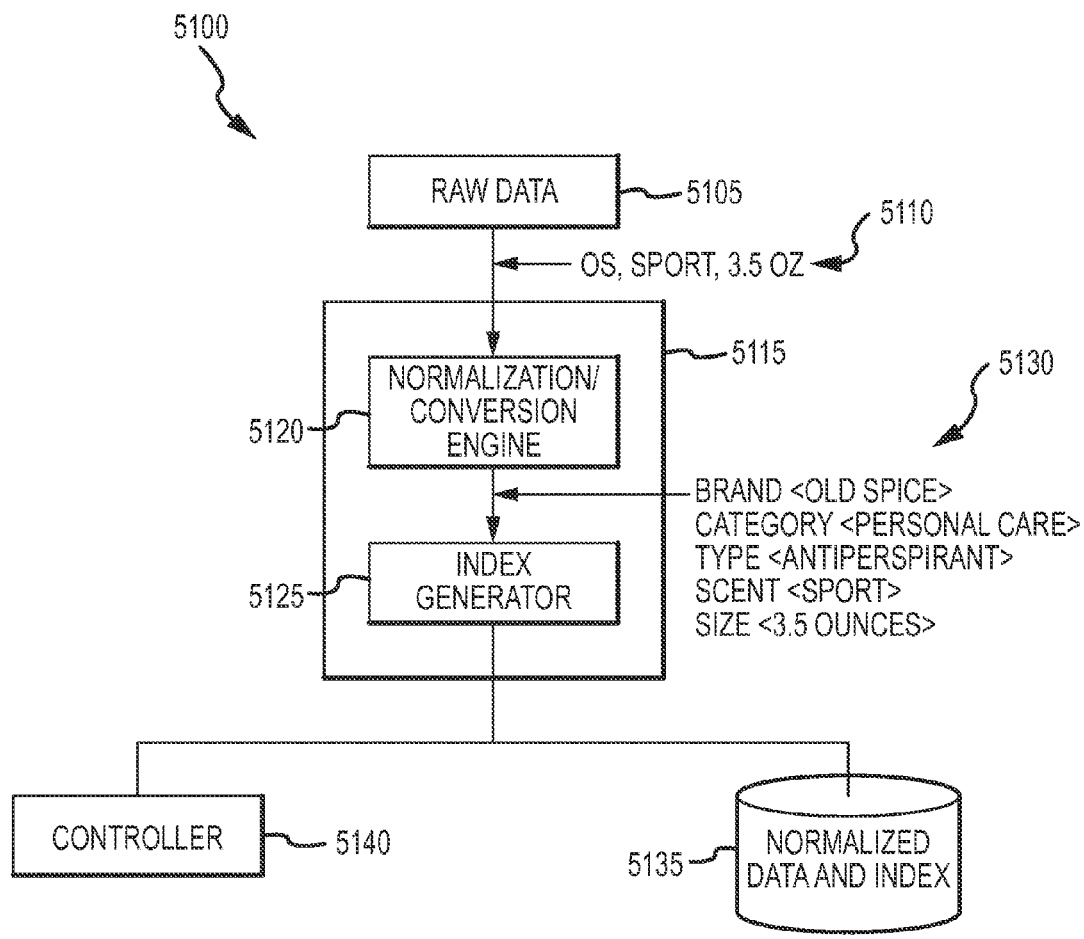
FIG. 21 is a schematic diagram illustrating a self-indexing data structure system in accordance with the present invention.

FIG. 21 illustrates a self-indexing data structure system 5100 in accordance with an embodiment of the present invention. Generally, the system 5100 is operative to receive raw or unstandardized source data 5105. The source data 5105 may include potential search terms, source terms from a source data collection, or both. In the case of potential search terms, the terms may be obtained from a pre-existing list or may be developed by a user. For example, the potential search terms may be drawn from a stored collection of search terms entered by users in the context of the subject matter of interest. Additional sources may be available in a variety of contexts, for example, lists that have been developed in connection with administering a pay-per-click search engine. The list may be updated over time based on monitoring search requests. Similarly, the source data 5105 may be previously developed or may be developed by the user. For example, in the context of online shopping applications, the source data 5105 may be drawn from an electronic product catalog or other product database.

An example of the form of the source data 5105 is shown in FIG. 21 as a text string 5110 which reads "OS, sport, 3.5 oz." In this example, the text string 5110 may reference a particular product, for example, an Old Spice antiperspirant stick having a "sport" scent and being 3.5 ounces. It should be appreciated that the raw source data 5105 may include data that is substantially unstandardized. For example, the brand may have been written OS, Old Spice, O. Spice, or the like. Similarly, the size of the product may be represented as 3.5 ounces, 3½ ounces, 103.5 milliliters, or the like. Moreover, the ordering and completeness of the various attributes may vary. In this regard, particularly in the case where the raw source data 5105 is from multiple sources (e.g., multiple product databases), a text string used to represent even the same product may be different.

The system 5100 may receive the source data 5105 utilizing a data conversion/indexing module 5115. The module 5115 may include a data normalization (or conversion) engine 5120 and an index generator 5125. Generally, the normalization engine 5120 may be operative to receive the source data 5105 and to convert the source data 5105 into a normalized form. An example textual form of a normalized data object 5130 is shown in FIG. 21. In this example, the conversion engine 5120 has converted the text string 5110 into a data object 5130 that includes a standardized format. More specifically, the data object may include various attributes (e.g., brand, category, type, scent, size, and the like) and associated attribute values (e.g., Old Spice, Personal Care, antiperspirant, sport, 3.5 ounces, and the like).

It will be appreciated that the general function of the normalization or conversion engine 5120 is to receive the source data 5110, and to output data objects (such as the data object 5130 represented in FIG. 21) that are in a standardized form. The engine 5120 may perform various normalization, classification, and/or translation operations to achieve this functionality. Further, the "rules" for interpreting and converting the source data 5110 may be generated in any number of ways including analyzing samples of source data by a computer and/or a Subject Matter Expert (SME). Specific systems and methods for normalizing, translating, and/or classifying the raw data 5105 are described in more detail below in Section II.

The module 5115 may also include the index generator 5125 that is operative to receive the normalized or standardized data objects 5120 from the conversion engine 5120 and create an identifier for the data. For example, the index generator may encode (or map) the attributes and attribute values for each data object into an index value (e.g., an integer or other data structure). As can be appreciated, an index may be used in a database system to improve the speed of operations (e.g., searches) on a database table. Further, indexes can be created using one or more columns of a database table, providing the basis for both rapid random look ups and efficient access of ordered records. The memory required to store the index created by the index generator 5125 may typically be less than that required by a table that includes the data objects themselves (since indexes usually contain only the key-fields according to which the table is to be arranged, and excludes all the other details in the table), yielding the possibility to store indexes in memory for a table whose data is too large to store in that memory. Specific examples of index data structures are provided below with reference to FIGS. 22 and 23.

The system 5100 may also include a storage structure 5135 that may be operative to store the normalized data objects as well as the index. The storage structure 5135 may include magnetic, optical, or solid-state storage media such as hard drives, optical disks, nonvolatile RAM devices, or the like. In some embodiments, the data storage structure 5135 may include more complex storage devices such as disk arrays or storage area networks (SANs), which may be coupled to the module 5115 via a standard Small Computer System Interface (SCSI), a Fibre Channel interface, a Firewire (IEEE 1394) interface, or any another suitable interface. Additionally, it is contemplated that in other embodiments, other suitable peripheral devices may be included in the system 5100, such as multimedia devices, graphics/display devices, standard input/output devices, etc.

A controller 5140 may be coupled to the module 5115 and the storage structure 5135, and may be operative to control the receipt of source data 5105, to configure the conversion engine 5120, to control access to the data storage structure 5135, and other functions.

More specifically, the controller 5140 may be operative to receive the source data 5105 from one or more sources including local or nonlocal databases, a search string entered by a user, a request by a computer-based tool, and the like. Further, the controller 5140 may provide an interface for a user (e.g., an SME) to configure the conversion engine 5120. In this case, the controller 5140 may include one or more keyboards, mice, displays, and the like. The users may operate the controller 5140 via the interface to define rules that may be used by the conversion engine 5120 to interpret or convert the source data 5105 into standardized data objects. The controller 5140 may also be operative to receive a request for a set of data stored in the storage structure 5135, and to access the set of data using the index. In this regard, the requested data may then be forwarded to the requesting source (e.g., a user, another database, a search engine, or the like).

Figure 22A:
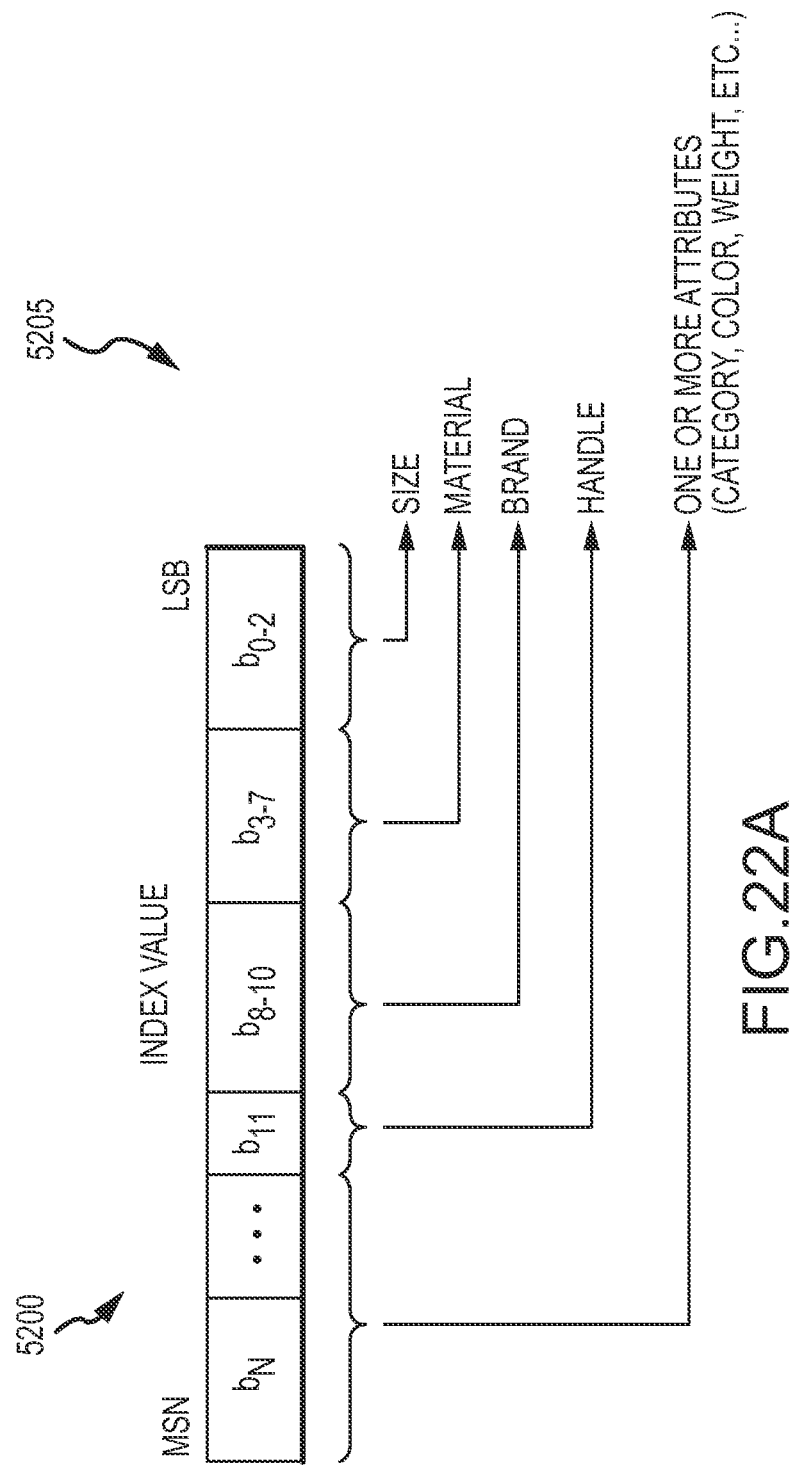

FIG. 22A illustrates an example data structure 5200 that may be generated by the index, generator 5125 to encode various attributes and attribute values of data. In this example, the data structure 5200 includes an integer value having N bits that are used to encode the various attributes and attribute values 5205 of coffee cups. It will be appreciated that the example provided herein may be simplified for explanatory purposes, and that the index, data structure may include other features not specifically shown in this example.

The N bits of the index structure 5200 are divided into a plurality of groups of bits that may each represent a specific attribute of a data object. In this example, bits 0-2 may be used to designate the Size of coffee cups. Bits 3-7 are used to designate the Material construction of the coffee cups. Bits 8-10 are used to designate the Brand of the coffee cups. Bit 11 is used to designate whether the coffee cups have a Handle or not. In addition, as shown, other bits (e.g., bits 12-N) may be used to encode one or more attributes of the coffee cups (e.g., category, color, weight, or the like). Further, since the index data structure 5200 may be used to encode data objects that represent things other than coffee cups, an array of bits may be used to designate that the data object represents a coffee cup.

Figures 22B, 22C:
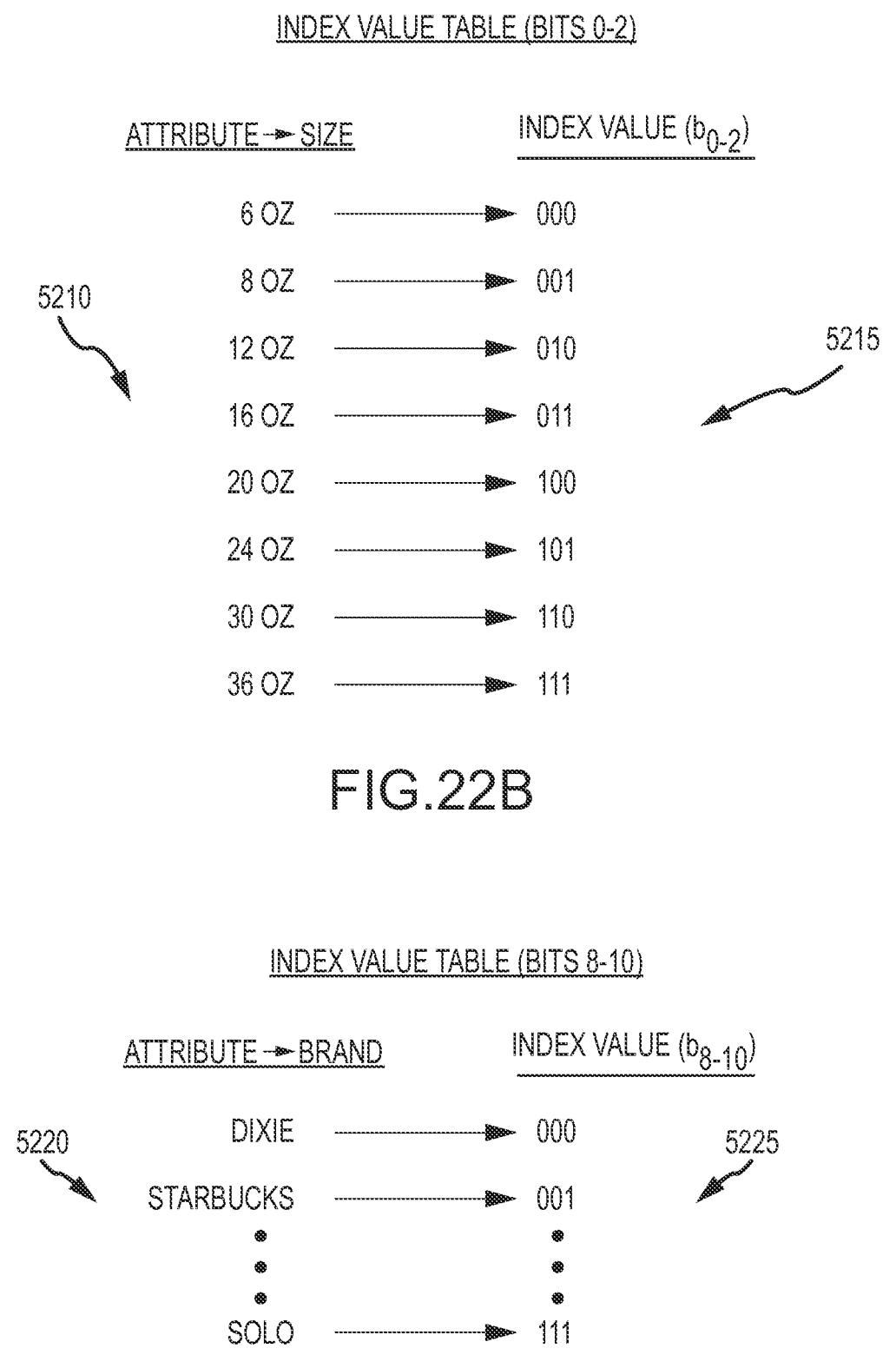

FIGS. 22B-C illustrate example index value tables that may be used to populate the index with bits that encode the various attributes of the data objects. FIG. 22B illustrates legal values 5210 for the Size attribute of the coffee cups. As shown in FIG. 22A, the Size attribute in this example is encoded in bits 0-2 of the index data structure 5200. The index value table shown in FIG. 22B indicates that the legal values for coffee cups are 6 oz, 8 oz, 12 oz, 16 oz, 20 oz, 24 oz, 30 oz, and 36 oz. Each of these values is associated with a binary number between 000b and 111b, such that each of the legal values is represented by a unique binary number. In this regard, the size of a particular coffee cup may be determined (or decoded) by reading the bits 0-2 of the associated index value.

Similarly, the index value table shown in FIG. 22C illustrates the legal values 5220 for the Brand attribute for the coffee cups. Each legal value 5220 of Brands is associated with a unique binary number 5225 that is stored as bits 8-10 in the index data structure 5200 shown in FIG. 22A.

It will be appreciated that the resulting index data structure 5200 provides specific information regarding the data object that it references. From this example, it can be seen that by decoding the various sets of bits of an index value, the specific attributes and attribute values of data stored in a database may be determined. For example, if a search request is made for 20 oz coffee cups having the Starbucks brand, all index number having a value of 100b at bits 0-2 and a value of 001b at bits 8-10 may be retrieved, and the associated data objects may be returned to the requesting entity.

Figure 23A:
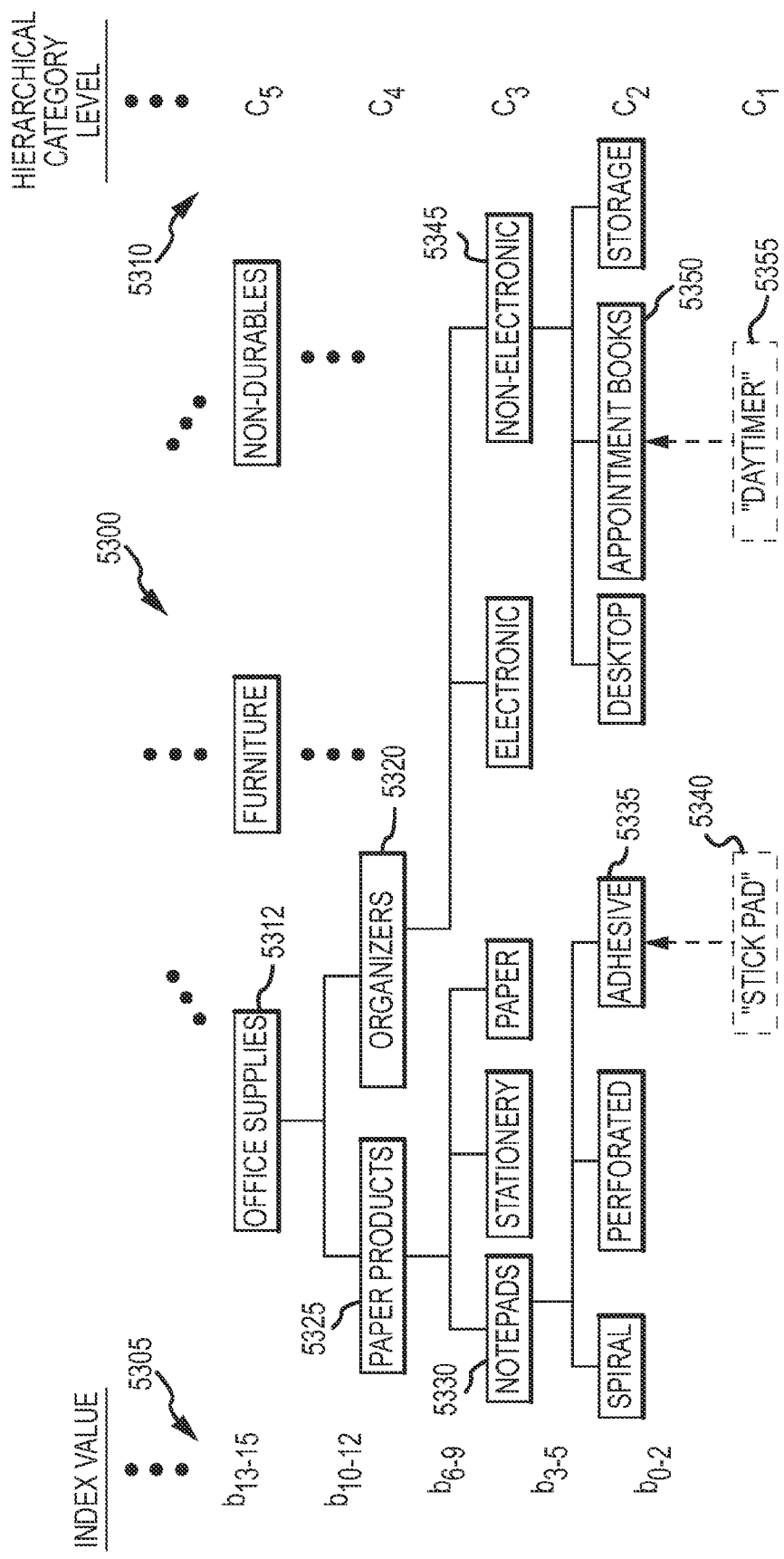
FIGS. 23A-B illustrate a hierarchical index structure that may be utilized to index data objects in accordance with the present invention.
Figure 23B:
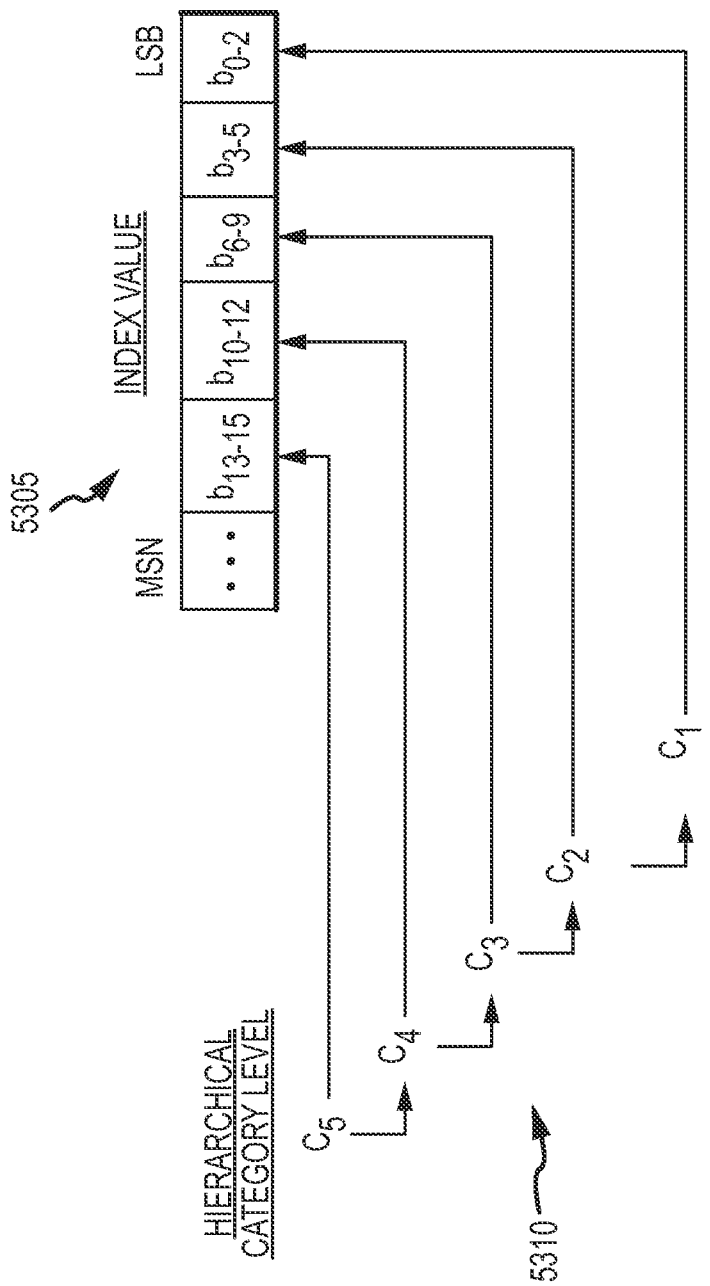

FIGS. 23A-B illustrate another index data structure 5305 that may be used to encode attributes and attribute values of data objects that have been normalized and/or standardized. In particular, FIG. 23A shows a portion of a parse tree 5300 for a particular subject matter such as the electronic catalog of an office supply warehouse. The parse tree 5300 includes a plurality of nodes (e.g., node 5315 labeled "Office Supplies," node 5320 labeled "Organizers," and the like) that are arranged hierarchically. For example, the node 5340 or classification is a sub-classification of "Adhesives" 5335, which is a sub-classification of "Notepads" 5330 which is a sub-classification of "Paper Products" 5325 which, finally, is a sub-classification of "Office_Supplies" 5315. Similarly, term 5355, in this case "Daytimer," is associated with classification "Appointment_Books" 5350, which is a sub-classification of "Non-electronic" 5345 which, in turn, is a sub-classification of "Organizers" 5320 which, finally, is a sub-classification of "Office_Supplies" 5315.

The hierarchy of the parse tree 5300 may be referenced in terms of category levels (C1, C2, C3, and so on) 5310. For example, the categories "Office Supplies," "Furniture," and "Non-Durables" may all be in the same category level (i.e., C5). In this regard, the sub-categories in included in sub-category levels are dependent upon which node of the category level above the sub-category is implemented. For example, the category level C3 includes "Notepads," "Stationary," and "Paper" under the "Paper Products" node 5325, and includes "Electronic" and "Non-Electronic" under the "Organizers" node 5320.

As shown in FIGS. 23A and 23B, in this example, the index data structure 5305 encodes attributes and attribute values for data objects by allocating a specific number of bits to each category level 5310 (C1, C2, C3, and the like). As shown best in FIG. 23B, each category level 5310 is mapped to a predetermined range of bits (e.g., Category C1 is mapped to bits 0-2 of the index data structure 5305).

As will be appreciated, an entity requesting data objects stored in a database may decode specific bits of the index data structure 5305 to access the desired data objects. For example, if a request is made for all data objects included in the category "Organizers" (node 5320 shown in FIG. 23A), the index data structure may be decoded by reading bits 10-12 (category level C4), bits 13-15 (category C5), and so on. It should be appreciated that any suitable encoding and decoding scheme may be utilized to map attributes and attribute values of data objects to the index data structure. For example, the number of bits allocated for each category level (C1, C2, C3, and the like) may be variable and/or dependent upon other category levels. In this regard, the number of bits allocated for each category or classification may depend on the number of legal values for the attribute. For example, an attribute with six legal values may utilize three bits, whereas an attribute with 800 legal values may utilize ten bits of the index data structure 5305.

Figure 24:
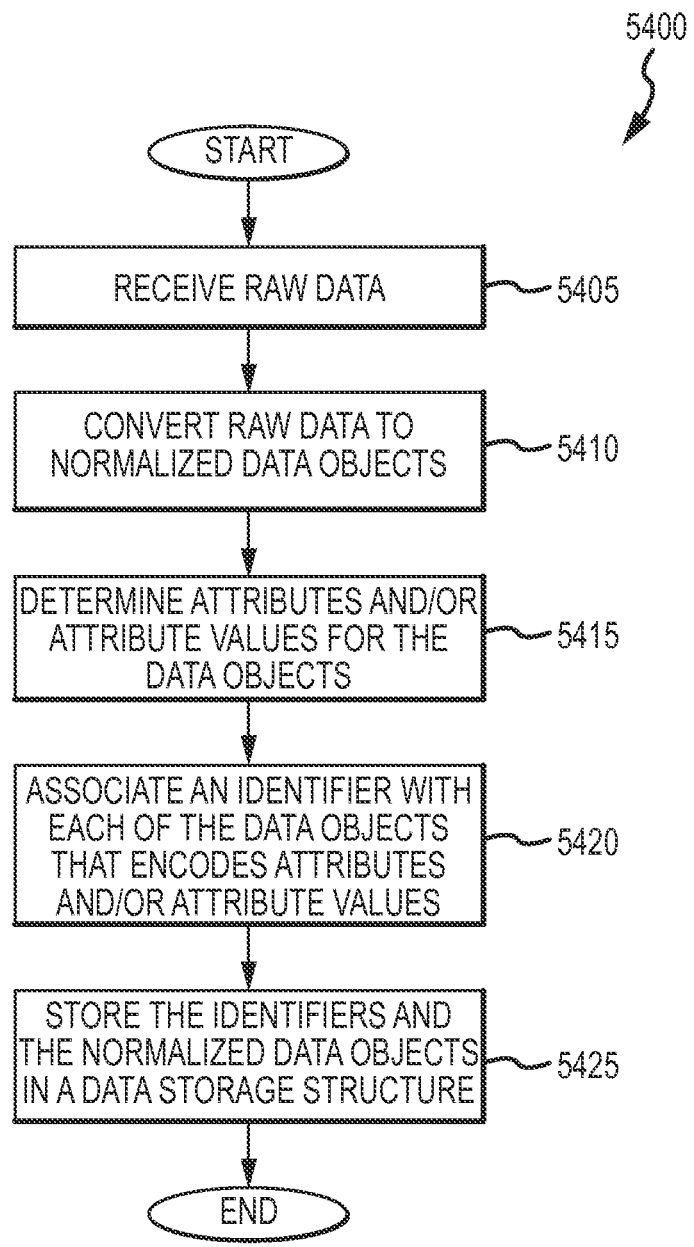
FIG. 24 is a flow chart illustrating a self-indexing data structure process in accordance with the present invention.

FIG. 24 illustrates a process 5400 for automatically generating an index data structure for data objects that have been converted from a raw or unstandardized form to a normalized or standardized form. The process 5400 includes receiving raw or source data (step 5405). The source data may be received from any data source including a legacy database from an inside or outside party, active databases, or the like.

Once the source data has been received, the data may be normalized and/or converted into a standardized format (step 5410). For example, the source data may be parsed into chunks of text and standardized using any suitable method, such as one or more of the methods described below. Once the source data has been converted to a standard form, attributes and attribute values for the data may be determined (step 5415). For example, if the raw source data included a text string "8 oz cup, cer.," the converted data object may indicate that the product has the following attributes and attribute values: TYPE=coffee cup, SIZE=8 ounces, and MATERIAL=ceramic. Of course, other attributes and attribute values may be specified or determined from the input text string.

Once the source data has been converted into normalized data objects with identified attributes and attribute values, an identifier (e.g., an index value) may be associated with each of the data objects (step 5420). As noted above, the identifier may be used by entities that need to access the data objects to improve the speed which the data objects may be searched. Further, the identifier may be used to access sets of data objects that share one or more attributes and/or attribute values. For example, in a database that stores data that represent office supplies, an entity may access "all office chairs that include leather seats."

Once the identifiers have been generated, the identifiers and the normalized data objects may be stored in a data storage structure (step 5425). As noted above, the data storage structure may include one or more magnetic, optical, or solid-state storage media such as hard drives, optical disks, non-volatile RAM devices, or the like. In some cases, the identifiers (or index data structure) may occupy less memory than the data objects themselves. In these cases, the identifiers may be stored in memory that has a relatively faster access time that the memory that stores the data objects. In other cases, the identifiers may occupy considerably more memory than the data objects, but may allow the data objects to be searched more rapidly.

Figure 25:
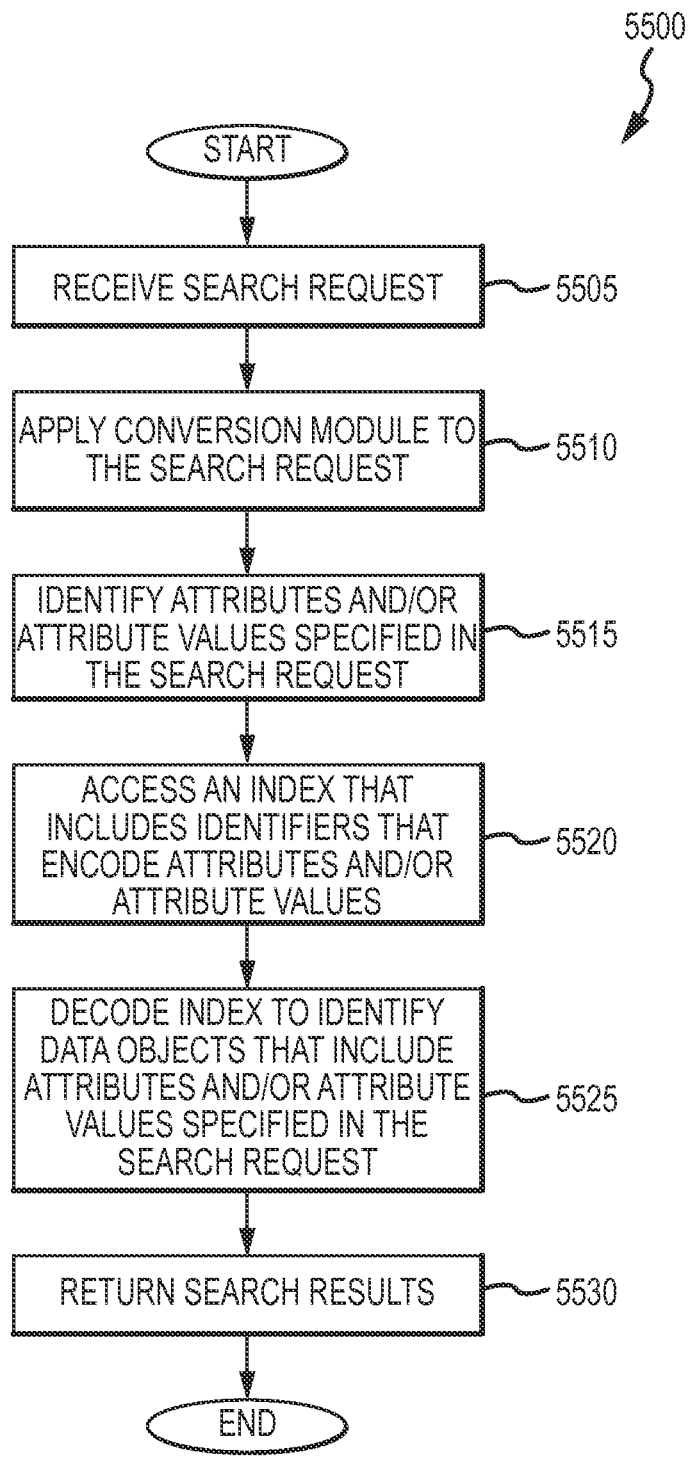
FIG. 25 is a flow chart illustrating a process for a search engine that utilizes a self-indexing data structure in accordance with the present invention.

FIG. 25 illustrates a process 5500 for executing a search of data stored in a database. In this example, the data may be normalized and indexed in accordance with the features of the present invention described above. Initially, a search request may be received by a system, such as the system 5100 shown in FIG. 21 (step 5505). The search request may be initiated from a user or computer that is located proximate or remote from the database being searched. In the case where the search request originates remotely, the database may be coupled to the searching entity via a suitable network (e.g., the Internet).

As an example, the search request may be initiated by a user through a keyboard or mouse, and may include a text string. As can be appreciated, the text string is likely to be in an unstandardized format. Continuing the coffee cups example, a user may type in "star bucks coffe cup." To discern the intent of the user, a conversion module may be applied to the search request that operates to normalize the text of the search request into unambiguous terms (step 5510). For example, the text "star bucks" may be converted into "Starbucks." Similarly, misspellings may be corrected by, for example, recognizing the similarity between the letters "coffe" and the word "coffee," together with recognizing that "coffee" is likely the intended term due the inclusion of the word "Starbucks" in the text string. As can be appreciated, various techniques may be utilized to convert and/or translate the search request into a form that may be utilized to search the database.

Once the text of the search request has been normalized, various attributes and attribute values of the search request may be identified (step 5515). In this example, the following attributes and attribute values may be identified: PRODUCT=coffee cup; and BRAND=Starbucks. In addition, other attributes and/or attribute values may be derived from the search string or from other sources (e.g., a user's prior search history, popular searches by other users, and the like).

Once the attributes and attribute values of the search string have been identified, they may be used to access (step 5520) and decode (step 5525) an index data structure that encodes attributes and attribute values of data objects. In this regard, the data objects may be rapidly searched using the index data structure, without the need to search the data objects themselves. Finally, the search results may be returned to the requesting entity (step 5530). As an example, the data objects (e.g., all Starbucks brand coffee cups stored in the database) may be displayed on a user's display in a web browser.

Figure 26:
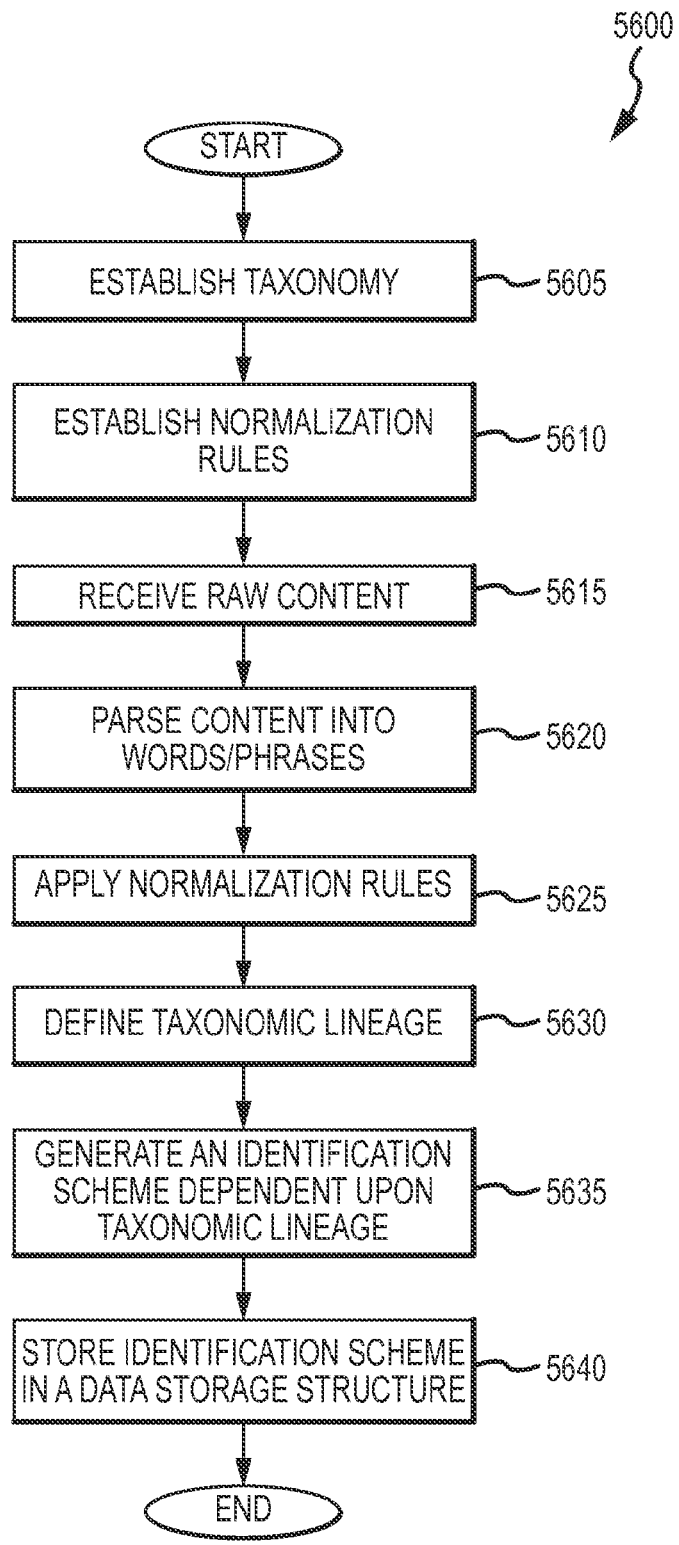
FIG. 26 is a flow chart illustrating a process for configuring a self-indexing data structure in accordance with the present invention.

FIG. 26 is a flowchart illustrating a process 5600 for constructing a database for enhanced searching using normalization, classification, and self-indexing. The illustrated process 5600 is initiated by establishing (step 5605) a taxonomy for the relevant subject matter. This may be performed by an SME and may generally involve dividing the subject matter into conceptual categories and subcategories that collectively define the subject matter. In many cases, such categories may be defined by reference materials or industry standards. The SME may also establish (step 5610) normalization rules, as discussed above, for normalizing a variety of terms or phrases into a smaller number of normalized terms. For example, this may involve surveying a collection or database of documents to identify sets of corresponding terms, abbreviations and other variants. It will be appreciated that the taxonomy and normalization rules may be supplemented and revised over time based on experience to enhance operation of the system.

Once the initial taxonomy and normalization rules have been established, raw or source content is received (5615) and parsed (5620) into appropriate chunks, e.g., words or phrases. Normalization rules are then applied (5625) to map the chunks into normalized expressions. Depending on the application, the content may be revised to reflect the normalized expressions, or the normalized expressions may merely be used for processing purposes. In any case, the normalized expressions may then be used to define (5630) a taxonomic lineage (e.g., office supplies, paper products, organizers, etc.) for the subject term and to generate (5635) an identification scheme and associated identifiers (e.g., index values) that are dependent upon the taxonomic lineage. The identifiers are then stored (5640) in a data storage structure and can be used to retrieve, print, display, transmit, etc., the data or a portion thereof. For example, the database may be searched based on classification or a term of a query may be normalized and the normalized term may be associated with a classification to identify responsive data.

Figure 27:
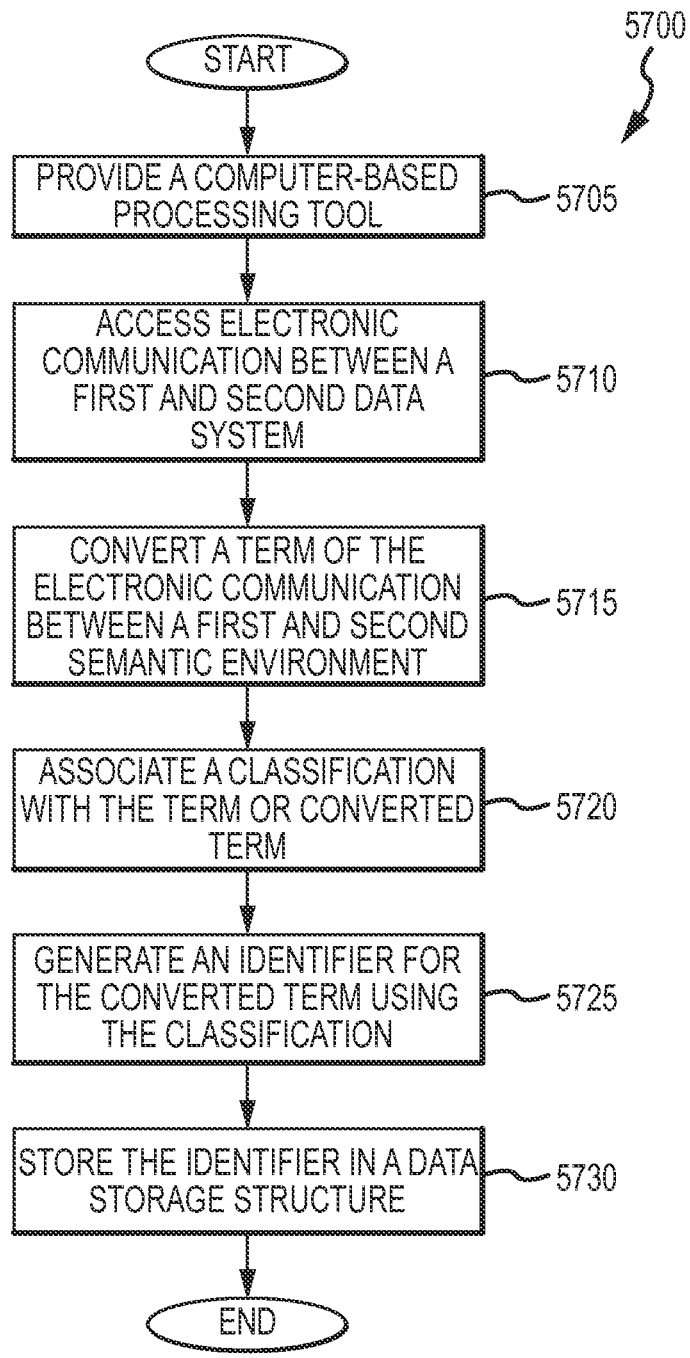
FIG. 27 is a flow chart illustrating a process for converting a term between a first and second semantic environment in accordance with the present invention.

FIG. 27 is a flowchart illustrating a process 5700 for converting terms between two semantic environments and automatically generating an index data structure. The process includes providing (step 5705) a computer-based processing tool to access (5710) a communication between first and second data systems, where the first data system operates in a first semantic environment defined by at least one of linguistics and syntax specific to that environment. The processing tool may convert (step 5715) at least one term of the communication between the first semantic environment and a second semantic environment, and associate (step 5720) a classification with the converted or unconverted term. The classification may identify the term as belonging to the same class as certain other terms based on a shared characteristic or attribute, for example, a related meaning (e.g., a synonym or conceptually related term), a common lineage within a taxonomy system (e.g., an industry-standard product categorization system, entity organization chart, scientific or linguistic framework, etc.), or the like.

The classification may then be used to generate (step 5725) an identifier (e.g., an index value) for the converted term. It will be appreciated that the identifier may be generated using the methods described above. Further, the identifier and the converted term may then be stored (step 5730) in a suitable data storage structure.

From the foregoing discussion, it will be appreciated that indexes are preferably generated from data that has been normalized and converted to a target form that is sufficiently standardized to yield reliable indexes and facilitate useful searches. This can be done in a variety of ways including the exemplary processes set forth in the following section.

II. Standardization and Conversion of Data

In this section, the standardization and conversion system of the invention is set forth in the context of particular examples relating to processing a source string including a product oriented attribute phrase. Such strings may include information identifying a product or product type together with a specification of one or more attributes and associated attribute values. For example, the source string (e.g., a search query or product descriptor from a legacy information system) may include the content "8 oz. ceramic coffee cup." In this case, the product may be defined by the phrase "coffee cup" and the implicit attributes of size and material have attribute values of "8 oz." and "ceramic" respectively.

While such source strings including product oriented attribute phrases provide a useful mechanism for illustrating various aspects of the invention, and in fact represent significant commercial implementations of the invention, it should be appreciated that the invention is not limited to such environments. Indeed, it is believed that aspects of the invention are applicable to virtually any other conversion environment with concepts such as product attributes and attribute values replaced, as necessary, by logical constructs appropriate to the subject environment, e.g., part of speech and form. Moreover, as noted above, the conversion rules are not limited to elements of a single attribute phrase or analog, but may involve relationships between objects, including objects set forth in separate phrases. Accordingly, the specific examples below should be understood as exemplifying the invention and not by way of limitation.

Many conversion environments are characterized by large volumes of "messy" data. For example, a business entity may have multiple repositories including product descriptors, e.g., associated with inventories, catalogues, invoices, order forms, search indexes, etc. These entries may have been created at different times by different people and tend to be messy in the sense that they are unstandardized (no particular convention is followed with respect to spelling, abbreviations, formats, etc) and often incomplete (e.g., not fully attributed with respect to product, manufacturer, size, packaging or other characteristics).

On the other hand, the entity may have, or be able to readily produce, some quantity of more readily useable data. For example, a business entity often can provide a set of data, perhaps from one or multiple legacy systems, that is reasonably standardized and, sometimes, structured. For example, the business entity may have product information in a table or spreadsheet form, or may have defined an XML schema for certain products and have product descriptors with associated tag information.

In one implementation, the system of the present invention involves leveraging the knowledge inherent in such "clean" data so as to reduce the time required for modeling the conversion environment (establishing a "metadata model" reflecting conversion rules specific to the conversion environment) and the overall conversion process. As will be understood from the description below, a self-learning tool can use this clean sample data in a number of ways, including: 1) recognizing a set of terms applicable to the environment, including misspellings and abbreviations, so as to develop a context specific dictionary; 2) statistically analyzing strings to recognize frequently used terms, patterns and relationships to enhance accuracy in resolving conversion ambiguities; 3) developing taxonomic relationships based on explicit elements of structured data or statistically (or otherwise) inferred elements; and 4) developing a set of attributes and corresponding permissible attribute values for use in disambiguating data strings and identifying invalid or undefined data conversion.

It should be appreciated that the sample data need not be fully standardized or fully attributed in this regard. Indeed, generic conversion tools, such as orthographic transformation engines and reusable foundation conversion modules (e.g., defining standard units and rules for weights and measures) can provide a substantial degree of understanding and disambiguation of data that is somewhat messy. All that is necessary is that the sample data is susceptible to yielding knowledge regarding the conversion environment. Moreover, such a self-learning tool is not limited, in linear fashion, to learning mode and execution mode. Rather, learning can continue during normal operation so as to progressively enhance statistical estimations and accuracy. Similarly, "sample" data can be iteratively processed, e.g., by first "cleaning" messy data and then using the cleaned data as sample data to develop a semantic metadata model.

Figure 20:
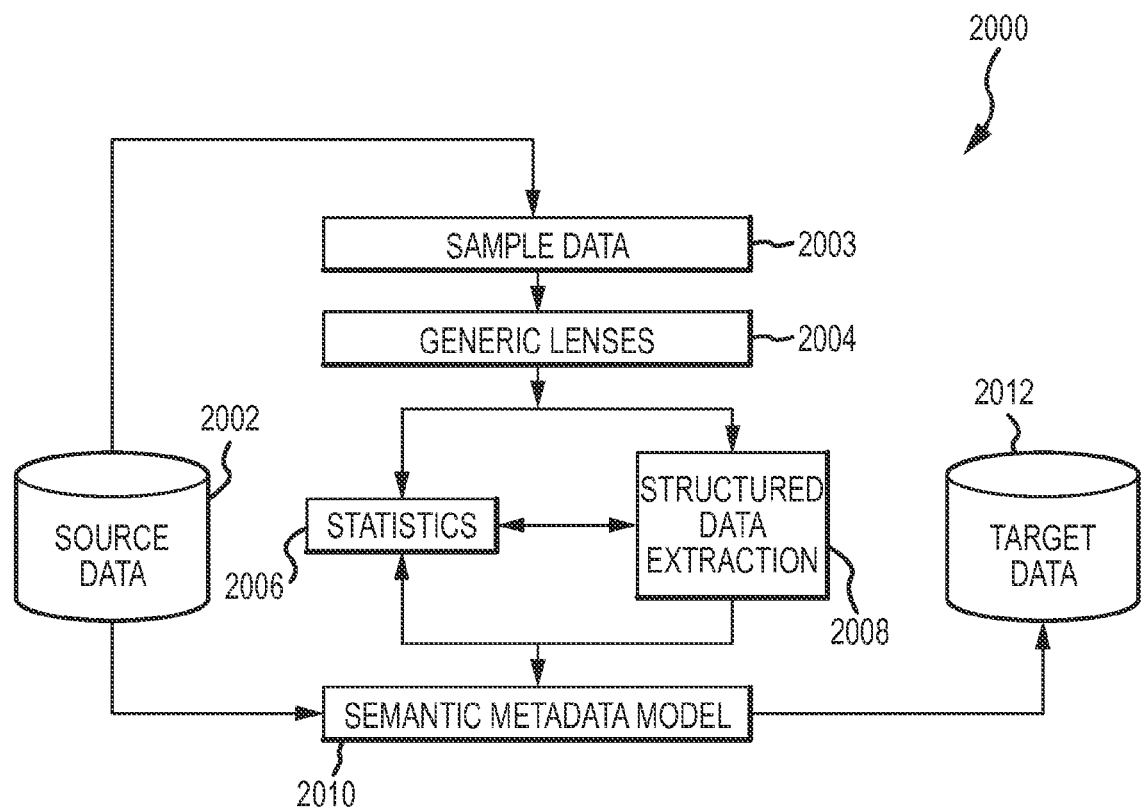
FIG. 20 is a block diagram of another self-learning tool in accordance with the present invention.

FIG. 20 provides a high level overview of a self-learning conversion system 2000 in accordance with the present invention. The system 2000 is operative for converting source data 2002 to target data 2012. This may be implemented in a variety of conversion contexts such as data cleaning, data aggregating, data matching or the like. In the context of the present invention, the target data may be used to generate an index for a data structure. In addition, the target data may include converted search terms, generated from raw search terms, so as to improve retrieval of data from the data structure. Although the source data 2003 is schematically illustrated as emanating from a single source, such data may be collected from multiple users, multiple legacy systems or the like.

The illustrated system 2000 is operative convert the source data 2002 to target data 2012 based on a semantic metadata model 2010. The semantic metadata model 2010 includes rules, specific to the illustrated conversion environment, for recognizing terms of the source data 2002, disambiguating terms of the source data 2002 and generating target data 2012 that is standardized with respect to terminology and format and is fully attributed.

The semantic metadata model 2010 is generated, at least in part, based on analysis of a set of sample data 2003 extracted from the source data 2002. In this regard, the source data 2002 may include many product descriptors reflecting a low level of standardization. FIG. 17 shows a set of non-standardized product descriptors relating to antiperspirant/deodorant products. As shown, there is little standardization as between the product descriptors regarding spelling, abbreviations, term ordering and completeness of product attributes. It will be appreciated that such product descriptors may be difficult for conventional machine tools to understand. However, unfortunately, such messy data is commonplace in the business world.

On the other hand, an entity may have some sample data that is in a more organized and standardized form. For example, a business entity may have some sample data collected in a spreadsheet form as shown in FIG. 15. While such data may not be fully standardized with respect to terminology and the like, such data reflects an attempt to organize product descriptors in terms of data fields. As will be discussed in more detail below, the self-learning tool of the present invention can operate with respect to unstandardized data such as shown in FIG. 17 or with respect to more standardized data as shown in FIG. 15 so as to develop a semantic metadata model 2010.

In the illustrated implementation, the sample data, whether standardized or unstandardized, may be processed by one or more generic data lenses 2004. Such generic data lenses 2004 are not specific to the conversion process under consideration. In this regard, the illustrated system 2000 can reuse large amounts of knowledge developed in other conversion contexts and can make use of general linguistic knowledge and knowledge relevant to a given industry. Thus, for example, the generic lenses may include linguistic tools such as an orthographic transformation engine for recognizing misspellings and abbreviations. The lenses 2004 may also include interpretation rules that are context dependent. For example, in the case of a set of spatial dimensions relating to a thin bar, the largest dimension may be interpreted as length, the next largest as width and the smallest as thickness. Similarly, terms may be disambiguated based on context such that, for example, "mil" as used in connection with power tools may be interpreted as the manufacturer "Milwaukee," whereas "mil" as used in relation to thin sheets of material may be interpreted as millimeters. In any event; the generic lenses 2004 are effective to clean, to some extent, the sample data 2003.

The cleaned data may then be processed by a statistics module 2006 and/or a structured data extraction module 2008. As will be described in more detail below, the statistics module 2006 can process data, including unstructured data as shown in FIG. 17, to identify attributes and attribute values based on progressive analysis of pieces of evidence and associated probabilities relating to potential conversions. The structured data extraction module 2008 can leverage the structure of the legacy data to accelerate development of the semantic metadata model 2010. Thus, for example, in the case of spreadsheet data, such as shown in FIG. 15, a set of attributes may be identified with respect to the column headings and permissible attribute values may be developed based on analysis of the associated columns of data. It will be appreciated that the structure data extraction module 2008 and statistics module 2006 do not necessarily function independently. For example, a statistical analysis may be performed on structured data to assist in disambiguating the content of the structural data. Moreover, information regarding the data structure obtained from the structured data extraction module 2008 may be used to seed the statistical analysis of module 2006.

As noted above, statistical processes may be employed to develop and train a conversion tool for a given conversion application as well as to operate the conversion tool to execute a conversion process. These statistical analyses are enhanced by implementing the analyses in relation to a particular subject matter context, e.g., so as to obtain subject matter specific information related to a subject matter context reflected in a single record, such as a product descriptor string, or a subject matter context developed based on consideration of multiple records. In the former regard, single record subject matter context cues may be recognized, for example, a dictionary of relevant terms, a frequency of term usage and attributes or attribute values likely to appear together (or not appear together). This subject matter context may relate to, for example, an ontology reflected in a frame-slot architecture and/or a parse tree structure. In the following discussion, such single record subject matter context assisted conversion processes are first described. Thereafter, the self-learning tool and functionality, using multi-record subject matter context cues and statistical processing, is described in more detail.

1. Single Record Subject Matter Context

A statistical analysis, as will be described in more detail below may be enhanced if the analysis tool can take context into account. For example, an orthographic transformation engine considering the abbreviation "blk" in isolation, might assign substantially equivalent probabilities to the potential transformations "black" and "block." However, if surrounding context is taken into account, "black" may be deemed a more probable transformation in the case of the string "blk paint," whereas "block" may be deemed more probable in the case of "blk wood." As this simple example illustrates, even minimal understanding of the subject matter context can assist in disambiguating a term under consideration. It will be appreciated that some such contextual cues may be inferred by a self-learning tool with little or no "seeding" of contextual knowledge. However, the performance of the statistical analysis tool can be improved through such seeding. For example, as noted above, contextual information may be inferred from structured elements of a sample set of structured data, e.g., if one, of the attributes identified from a table heading is "color," that would tend to increase the likelihood that "blk" means "black." In this regard, performance can be further improved by seeding the statistical analysis tool with some more complete information describing an ontology of the conversion environment.

In the implementations described below, at least some conversions are executed with the assistance of a frame-slot architecture. Such a frame-slot architecture may function independently to define a full conversion model for a given conversion application, or may function in conjunction with one or more parse tree structures to define a conversion model. In the latter regard, the frame-slot architecture and parse tree structures may overlap with respect to subject matter. Those technologies are generally, though not exclusively, described below in relation to obtaining subject matter context cues from a single record.

The above-noted coffee cup example is illustrative in this regard. It may be desired to correlate the source string "8 oz. ceramic coffee cup" to a product database, electronic catalogue, web-based product information or other product listing. Such a product listing may include a variety of product types, each of which may have associated attributes and grammar rules. In this regard, the product types and attributes may be organized by one or more parse-tree structures. These parse tree structures, which are described and shown in U.S. patent application Ser. No. 10/970,372, generally organize a given subject matter into a hierarchy of classes, subclasses, etc., down to the desired level of granularity, and are useful for improving conversion accuracy and improving efficiency in building a grammar among other things. In this case, "coffee cup" may fall under a parse tree node "cups" which, in turn falls under a parent node "containers" which falls under "housewares," etc. Similarly, the same or another parse tree may group the term "oz.", or a standardized expression thereof (e.g., defined by a grammar) such as "ounce" under the node "fluid measurements" (ounce may also appear under a heading such as "weights" with appropriate grammar rules for disambiguation) which, in turn, may fall under the parent node "measurements", etc.

As noted above, such a parse tree structure has certain efficiencies in connection with conversion processes. However, in some cases, very deep parses may be required, e.g., in connection with processing terms associated with large data systems. Moreover, such terms are often processed as individual fields of data rather than closer to the whole record level, thereby potentially losing contextual cues that enhance conversion accuracy and missing opportunities to quickly identify content anomalies or implement private schema to define legal attributes or values for a given information object. Finally, such parse tree processes may impose a rigid structure that limits applicability to a specific subject matter context, thereby limiting reuse of grammar segments.

By contrast, a frame-slot architecture allows for consideration of source string information at, or closer to, the whole record level. This enables substantial unification of ontology and syntax, e.g., collective consideration of attribute phrases, recognized by the grammar and attribute values contained therein. Moreover, this architecture allows for consideration of contextual cues, within or outside of the content to be converted or other external constraints or other external information. In the coffee cup example, the frame-slot architecture allows for consideration of the source string "8 oz. coffee cup" in its entirety. In this regard, this string may be recognized as an attribute phrase, having "coffee cup" as an object. Grammar rules specific to this object or a class including this object or rules of a public schema may allow for recognition that "oz." means "ounce" and "ounce" in this context is a fluid measure, not a weight measure. A user-defined schema, for example, a private schema of the source or target information owner, may limit legal quantity values associated with "ounce" in the context of coffee cups to, for example, "6", "8" and "16". In this case, recognition of "8" by the schema provides increased confidence concerning the conversion. If the value had been "12", which would not comply with the schema in this example, this might serve, for example to quickly identify an anomaly (e.g., in the case of mapping records from a legacy data system to a target system) or identify an imperfect match (e.g., in the case of a search query) so that appropriate action may be taken.

The frame-slot architecture thus encompasses a utility for recognizing string segments or terms, obtaining contextual cues from within or external to the string, accessing grammar rules specific to the subject matter of the string segment and converting the string segment. This may avoid deep parses and allow for greater conversion confidence and accuracy. Moreover, greater grammar flexibility is enabled, thus allowing for a higher degree of potential reuse in other conversion contexts. In addition, executing such processes by reference to a schema enables improved context-related analysis. In short, conversions benefit from surrounding and external context cues in a manner analogous to human processing.

As noted above, the frame-slot architecture may be developed in a top-down or bottom-up fashion. For example, objects, associated attributes and legal attribute values may be defined as schema that are imposed on the data. In the coffee cup example, all of these may be defined based on an analysis of a product inventory or the structure of a legacy information system. In either case, the schema may dictate the legal values for quantity to 6, 8 and 16. Any information not conforming to the schema would then be identified and processed as an anomaly. Conversely, the legal values may be defined based on the data. For example, files from a legacy information system may be used to define the legal attribute values which, then, develop as a function of the input information. As discussed in the second section of this description below, a sample set of data can be statistically analyzed in relation to such a frame-slot architecture for improved automation of system training and conversion process execution. Such statistical analysis may be used to at least partially automate development of the frame-slot architecture.

Figure 1:
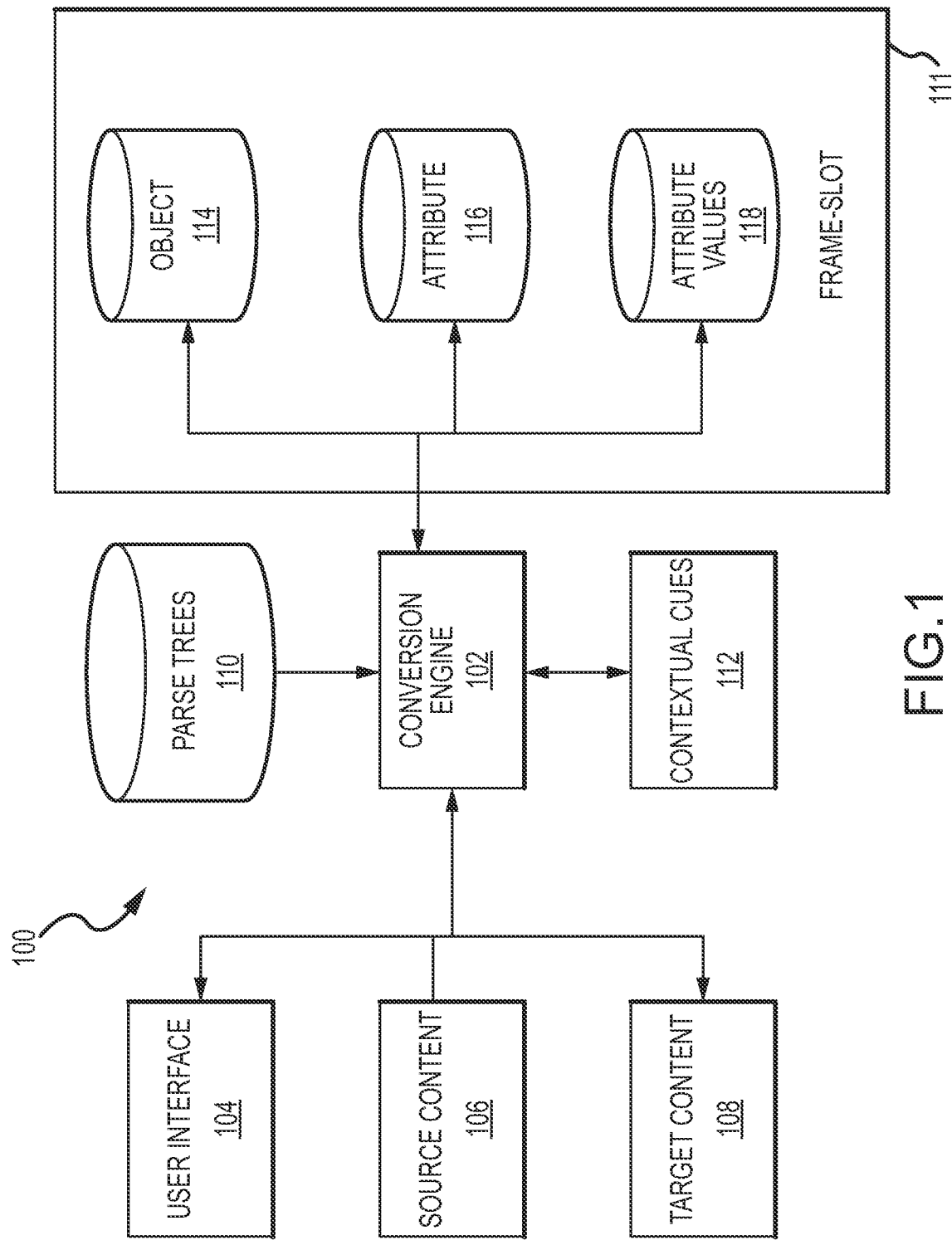
FIG. 1 is a schematic diagram of a semantic conversion system in accordance with the present invention.

FIG. 1 illustrates a system 100 for implementing such conversion processing. The illustrated system 100 includes a conversion engine 102 that is operative to execute various grammar rules and conversion rules for converting source information to a target form. In the illustrated embodiment, the system 100 is operative to execute both frame-slot architecture methodology and parse tree structure methodology. However, it will be appreciated that a frame-slot architecture may be executed in accordance with the present invention in the absence of a cooperating parse tree environment.

The illustrated grammar engine receives inputs and/or provides outputs via a workstation associated with the user interface 104. For example, in a set-up mode, a user may select terms for processing and create associated relationships and grammar rules via the user interface 104. In the context of a search system, a search query may be entered, and search results may be received, via the user interface 104. In this regard, the grammar engine 102 may be resident at the work station associated with the user interface 104, or may communicate with such a work station via a local or wide area network.

The source content 106 includes the source string to be converted. Depending on the specific application, this content 106 may come from any of a variety of sources. Thus, in the case of an application involving transferring information from one or more legacy information systems into a target information system, the source content 106 may be accessed from the legacy systems. In the case of a search engine application, the source content may be derived from a query. In other cases, the source content 106 may be obtained from a text to be translated or otherwise converted. The source content 106 may be preprocessed to facilitate conversion or may be in raw form. In the case of preprocessing, the raw content may be supplemented, for example, with markers to indicate phrase boundaries, tags to indicate context information, or other matter. Such matter may be provided in a set-up mode process. In addition, some such information may be present in a legacy system and may be used by the conversion engine 102. It will be appreciated that the sources of the content 106 and the nature thereof is substantially unlimited.

The illustrated conversion engine 102 performs a number of functions. In this regard, the engine 102 is operative to process the source content 106 to parse the content into potential objects and attributes, identify the associated attribute values, and, in some cases, recognize contextual cues and other matter additional to the content to be transformed that may be present in the source content. The engine 102 then operates to convert the relevant portion of the source content 106 using a parse tree structure 110 and/or a frame-slot architecture 111, and provides a converted output, e.g., to a user or target system.

With regard to the parse tree structure 100, such a structure is generally developed using the conversion engine 102 in a set-up mode. The nodes of the parse tree structure 110 may be defined by someone familiar with the subject matter under consideration or based on an analysis of a data set. Moreover, certain structure developed in connection with prior conversion applications may be imported to facilitate the set-up process. Such a set-up process is described in U.S. patent application Ser. No. 10/970,372, which is incorporated herein by reference. At a high level, this set-up involves defining the hierarchical structure of the tree, populating the various nodes of the tree, developing standardized terminology and syntax and associated grammar and conversion rules associated with the tree and mapping source content variants to the standardized terminology and syntax.

In the case of the frame-slot architecture 111, the conversion engine 102 obtains the source content 102 and identifies potential objects, attributes and attribute values therein. In this regard, the source content 106 may be parsed as discussed above. In addition, the engine 102 may obtain contextual cues 112 to assist in the conversion. As noted above, such cues may be internal or external to the source content 106. External cues may be based on the identity or structure of a source information system, defined by a schema specific to the frame-slot conversion, or based on information regarding the subject matter under consideration obtained from any external source. For example, information indicating that, when used in connection with "coffee cup" the term "ounce" is a fluid (not a weight) measure, may be encoded into, metadata of a legacy information system, defined by a private schema developed for the subject conversion application or derived from an analysis of external information sources.

In the context of the frame-slot architecture, the conversion engine is operative to: identify potential objects, attributes and attribute values; process such information in relation to certain stored information concerning the objects, attributes and attribute values; access associated grammar and conversion rules; and convert the information from the source form to a target form. In this regard, the illustrated system 100 includes stored object information 114, stored attribute information 116 and stored attribute value information 118. This information may be defined by a public or private schema or by reference to external information regarding the subject matter under consideration. For example, the object information 114 may include a list of recognized objects for which the frame-slot architecture is applicable together with information associating the object with legal attributes and/or attribute values and other conversion rules associated with that object. The attribute information 116 may include a definition of legal attributes for the object together with information regarding associated attribute values and associated grammar and conversion rules. Finally, the attribute value information 118 may include a definition of legal attribute values for given attributes together with associated information concerning grammar and conversion rules.

Figure 2:
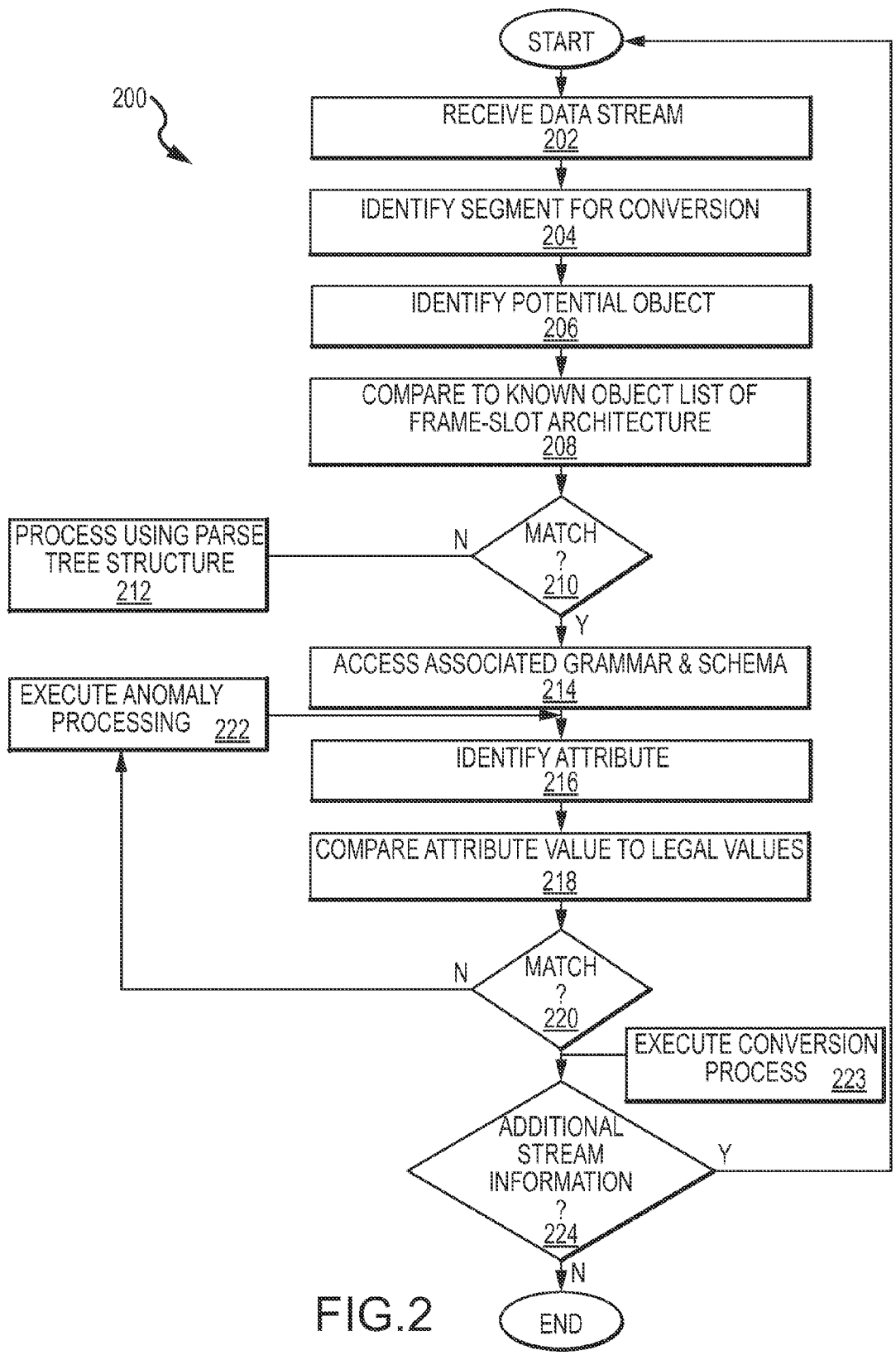
FIG. 2 is a flow chart illustrating a semantic conversion process in accordance with the present invention.

FIG. 2 shows a flow chart illustrating a process 200 that may be implemented by a conversion system such as described above. It will be appreciated that the various process steps illustrated in FIG. 2 may be combined or modified as to sequence or otherwise. Moreover, the illustrated process 200 relates to a system that executes a parse tree structure as well as a frame-slot architecture. It will be appreciated that a frame-slot architecture in accordance with the present invention may be implemented independent of any associated parse tree structure.

The illustrated process 200 is initiated by receiving (202) a data string from a data source. Such a data string may be entered by a user or accessed from a legacy or other information system. A segment of the data string is then identified (204) for conversion. For example, the segment may comprise an attribute phrase or any other chunk of source data that may be usefully processed in a collective form. Such a segment may be identified as the entirety of an input such as a search query, the entirety or a portion of a file from a legacy or other information system, or based on a prior processing step whereby phrase boundaries have been marked for purposes of conversion processing or based on logic for recognizing attribute phrases or other chunks to be co-processed.

In the illustrated process 200 the identified segment is then processed to identify (206) a potential object within the segment. In the case of the coffee cup example above, the object may be identified as the term "cup" or "coffee cup." The potential object may be identified by comparison of individual terms to a collection of recognized objects or based on a preprocessing step wherein metadata has been associated with the source content to identify components thereof including objects. The potential object is then compared (208) to a known object list of a frame-slot architecture. As discussed above, within a given subject matter, there may be a defined subset for which frame-slot processing is possible. In the illustrated process 200, if a match (210) is identified, the system then accesses (214) an associated grammar and schema for processing in accordance with the frame-slot architecture. Otherwise, the segment is processed (212) using a parse tree structure. As a further alternative, if no object is recognized, an error message may be generated or the segment may be highlighted for set-up processing for out of vocabulary terms, e.g., so as to expand the vocabulary and associated grammar rules.

In the case of processing using the frame-slot architecture, an attribute associated with the object is then identified (216). In the coffee cup example, the terms "ceramic" or "8 oz." may be identified as reflecting attributes. Such identification may be accomplished based on grammar rules or based on metadata associated with such terms by which such terms are associated with particular attribute fields. The associated attribute values are then compared (218) to legal values. For example, the value of "8 oz." may be compared to a listing of legal values for the attribute "fluid measurement" in the context of "coffee cup." These legal values may be defined by a private schema, for example, limited to the inventory of an entity's product catalog or may be based on other external information (e.g., defining a legal word form based on part of speech). If a match is found (220) then the attribute phrase is recognized and an appropriate conversion process if executed (223) in accordance with the associated grammar and conversion rules. The process 200 then determines whether additional string information (224) is available for processing and either processes such additional information or terminates execution.

In the case where the attribute value does not match a legal value, anomaly processing is executed (222). How anomalies are processed generally depends on the application and context. For example, if an anomaly is identified during a set-up process, the anomalous attribute value may be verified and added to the legal values listing. For example, in the coffee cup example, if the attribute value is "12 oz." and that value does not match a previously defined legal value but, in fact, represents a valid inventory entry, the term "12 oz." (or a standardized version thereof) may be added to the legal values list for the attribute "fluid measurement" in the context of "coffee cup."

Alternatively, further processing may indicate that the attribute value is incorrect. For example, if the attribute value was "6 pack," an error in parsing may be indicated. In this case, an appropriate error message may be generated or the segment may be reprocessed to associate an alternate attribute type, e.g., "object quantity," with the term under consideration.

In other contexts, different anomaly processing may be executed. For example, in the case of processing a search query, illegal values may be ignored or closest match algorithms may be executed. Thus, in the case of a query directed to a "12 oz. coffee cup," search results may be generated or a link may be executed relative to inventory related to coffee cups in general or to 8 and 16 oz. coffee cups. It will be appreciated that many other types of anomaly processing are possible in accordance with the present invention.

Figure 4:
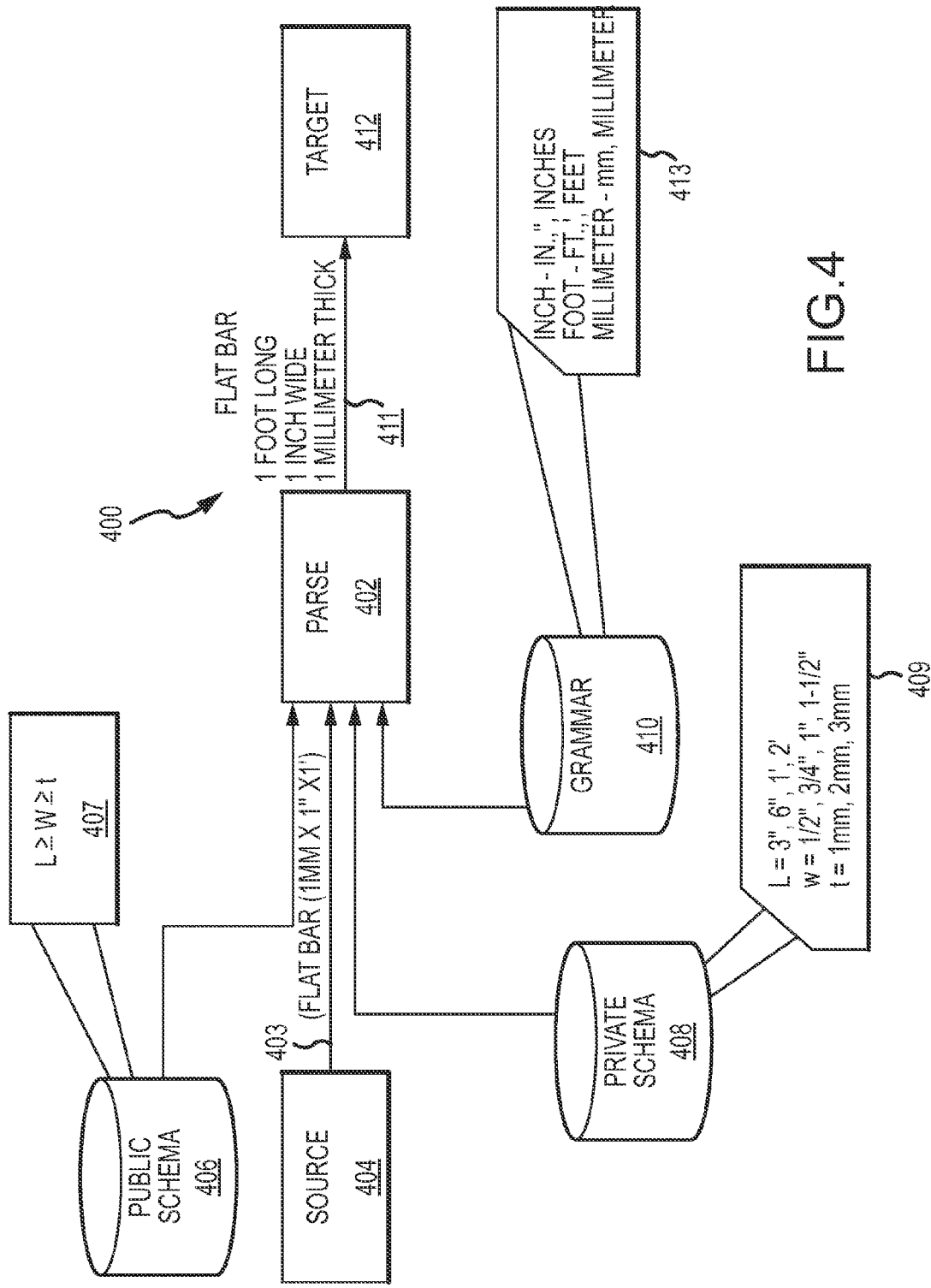
FIG. 4 is a schematic diagram illustrating the use of public and private schema in a conversion process in accordance with the present invention.
Figure 5:
FIGS. 5-6B illustrate exemplary user interfaces in accordance with the present invention.

In the above examples, the conversion system can implement both a frame-slot architecture and a parse tree structure. This architecture and structure will now be described in more detail. Referring first to FIG. 4, a schematic diagram of a conversion system 400 in accordance with the present invention is shown. The illustrated conversion system 400 includes a parser 402 for use in parsing and converting an input string 403 from a source 404 to provide an output string 411 in a form for use by a target system 412. In this case, the source string 403 includes the content "flat bar (1 mm×1"×1')." To accomplish the desired conversion, the parser 402 uses information from a public schema 406, a private schema 408 and a grammar 410. The public schema 406 may include any of various types of information that is generally applicable to the subject matter and is not specific to any entity or group of entities. In this regard, FIG. 5 illustrates an example structure 500 showing how public information related to the subject matter area may be used to define a conversion rule. As shown, a new structure 500 includes a dictionary 504 that forms a portion of the public schema 502. Panel 506 shows definitions related to the object "flat bar." Specifically, "bar" is defined as "straight piece that is longer than it is wide" and "flat" is defined as including "major surfaces distinctly greater than minor surfaces." Such definitions may be obtained from, for example, a general purpose dictionary, a dictionary specific to the subject matter, a subject matter expert or any other suitable source. These definitions are translated to define a rule as shown in panel 508. Specifically, the associated rule indicates that "length is greater than width and width is greater than thickness." This rule may then be written into the logic of a machine-based conversion tool. Referring again to FIG. 4, this rule is reflected in file 407 of public schema 406.

Figure 6A:
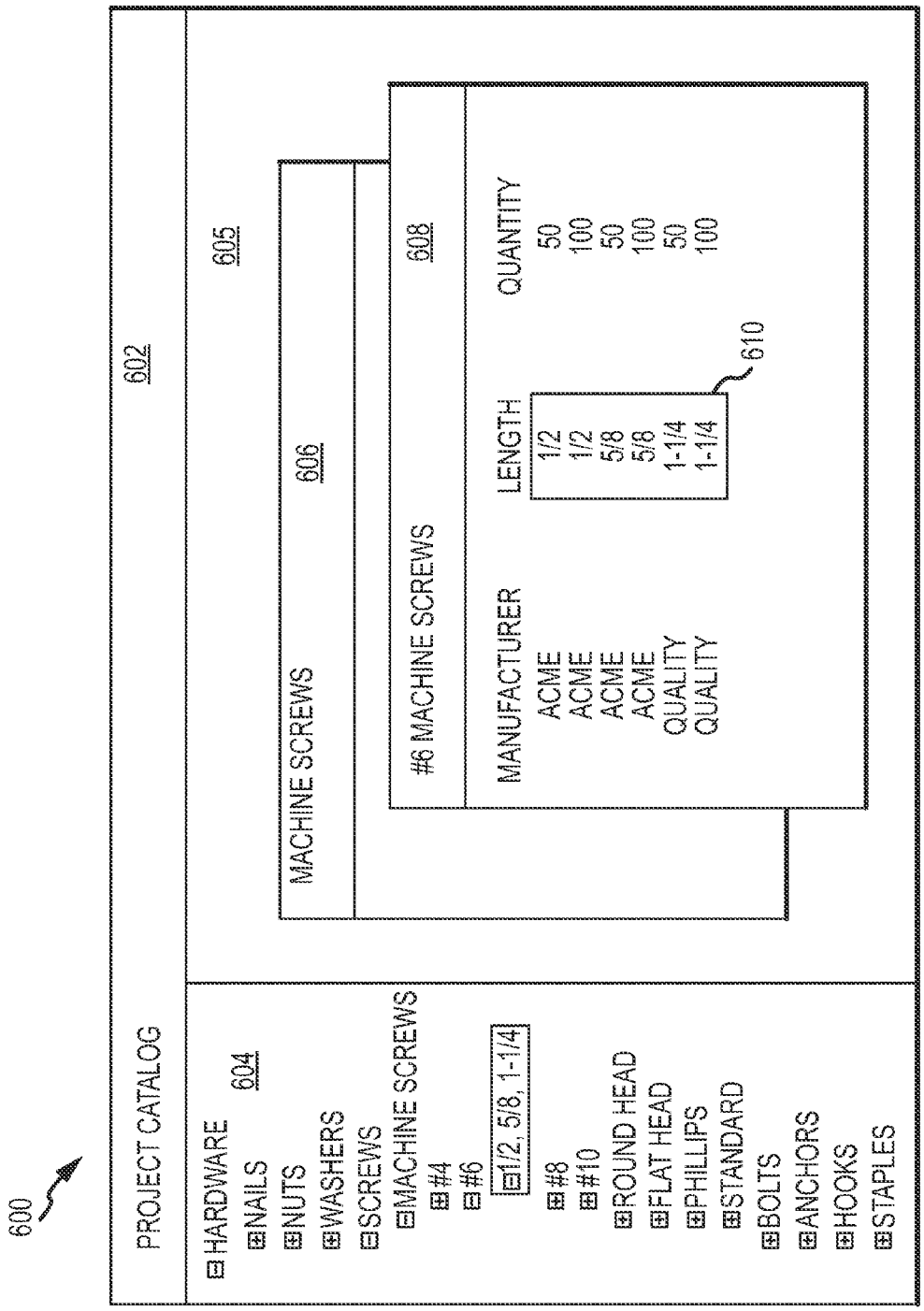

The parser 402 also receives input information from private schema 408 in the illustrated example. The private schema 408 may include conversion rules that are specific to an entity or group of entities less than the public as a whole. For example, the private schema 408 may define legal values for a given attribute based on a catalog or inventory of an interested entity such as an entity associated with the target system 412. An associated user interface 600 is shown in FIG. 6A. For example, the user interface 600 may be used in a start-up mode to populate the legal values for a given attribute. In this case, the user interface is associated with a particular project 602 such as assembling an electronic catalog. The illustrated user interface 600 includes a data structure panel 604, in this case reflecting a parse-tree structure and a frame-slot structure. The interface 600 further includes a private schema panel 605. In this case, the private schema panel 605 includes a number of windows 606 and 608 that define a product inventory of a target company. In this case, a length field 610 associated with a table for #6 machine screws is used to define legal attribute value 612 at a node of panel 604 corresponding to attribute values for #6 machine screws. Associated legal value information is shown as a file 409 of the private schema 408 in FIG. 4.

Figure 6B:
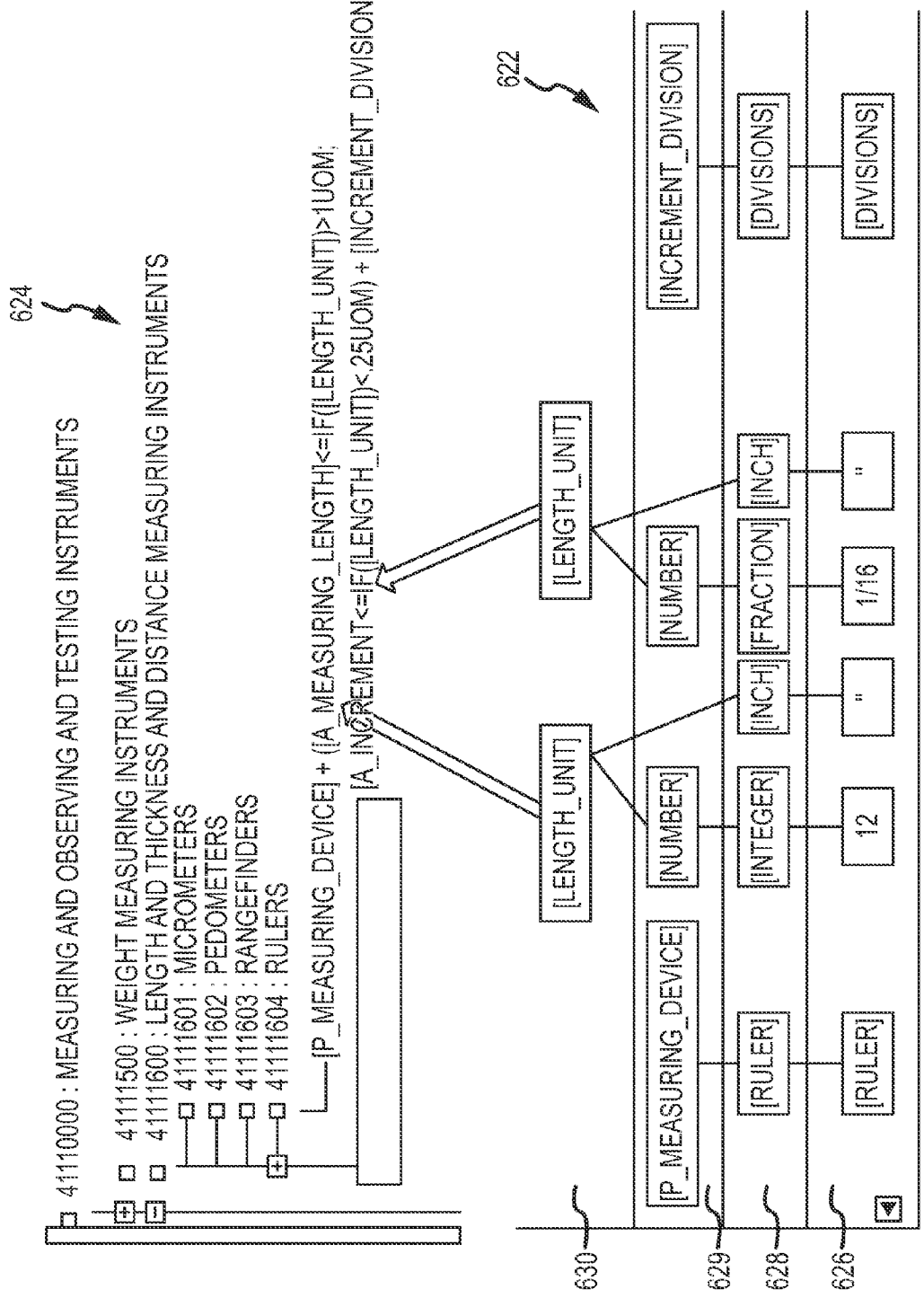

A further example of user interface segments 620 is shown in FIG. 6B. Specifically, FIG. 6B shows a parse tree graphics panel 622 and a parse tree node map panel 624. For purposes of illustration, these panes 622 and 624 are shown in a stacked arrangement. However, it should be appreciated that the panels 622 and 624 may be otherwise arranged on a user interface screen or provided on separate screens. Panel 622 shows a parse tree for a particular product descriptor. In this case, the product descriptor is shown at the base level 626 of the parse tree as "ruler 12" 1/16" divisions." Layers 628-630 show patent nodes of the parse tree. Of particular interest, both of the chunks "12"" and "1/16"" are associated with the high level node "[length_unit]" reflecting the recognition by a parse tool that each of these chunks indicates a measure of length.

If the parse tree structure went no deeper, and there was not frame-slot logic available, these two length measures would present an ambiguity. However, human reader would readily recognize that, in the context of rulers, "12"" likely represents the overall length of the ruler and "1/16"" most likely represents measurement increments. In the case of a frame-slot architecture, such logic can be captured by a rule that enables the parse tool to recognize and apply such context cues to provide accurate interpretations without deep parses.

In this case, such a rule is reflected within the parse tree node map of panel 624. Specifically, a rule for interpreting "length unit" designations in the context of rulers (and, perhaps, other length measuring devices) is encoded under the "ruler" node. As shown, the rule interprets a given "length unit" as indicating "a measuring length" if the associated attribute value is greater than 1 unit of measure (uom), and treats the "length unit" as indicating an "increment" if the associated attribute value is less than 0.25 uom. This provides a certain and structurally efficient mechanism for disambiguating and converting length units in this context. Moreover, it is anticipated that such rules will be reusable in other contexts within a project (e.g., for tape measures or straight edges) and in other projects.

Grammar 410 also provides information to the parser 402. The grammar may provide any of various information defining a lexicon, syntax and an ontology for the conversion process. In this regard, the grammar may involve definition of standardized terminology described in U.S. patent application Ser. No. 10/970,372. Thus, in the illustrated example, file 413 associates the standardized terms "inch," "foot," and "millimeter" with various alternate forms thereof.

The parser 402 can then use the input from the public schema 406, private schema 408 and grammar 410 to interpret the input string 403 to provide an output string 411 to the target 412. In this case, the noted input string 403 is interpreted as "flat bar-1' long, 1" wide and 1 mm thick.

Figure 3:
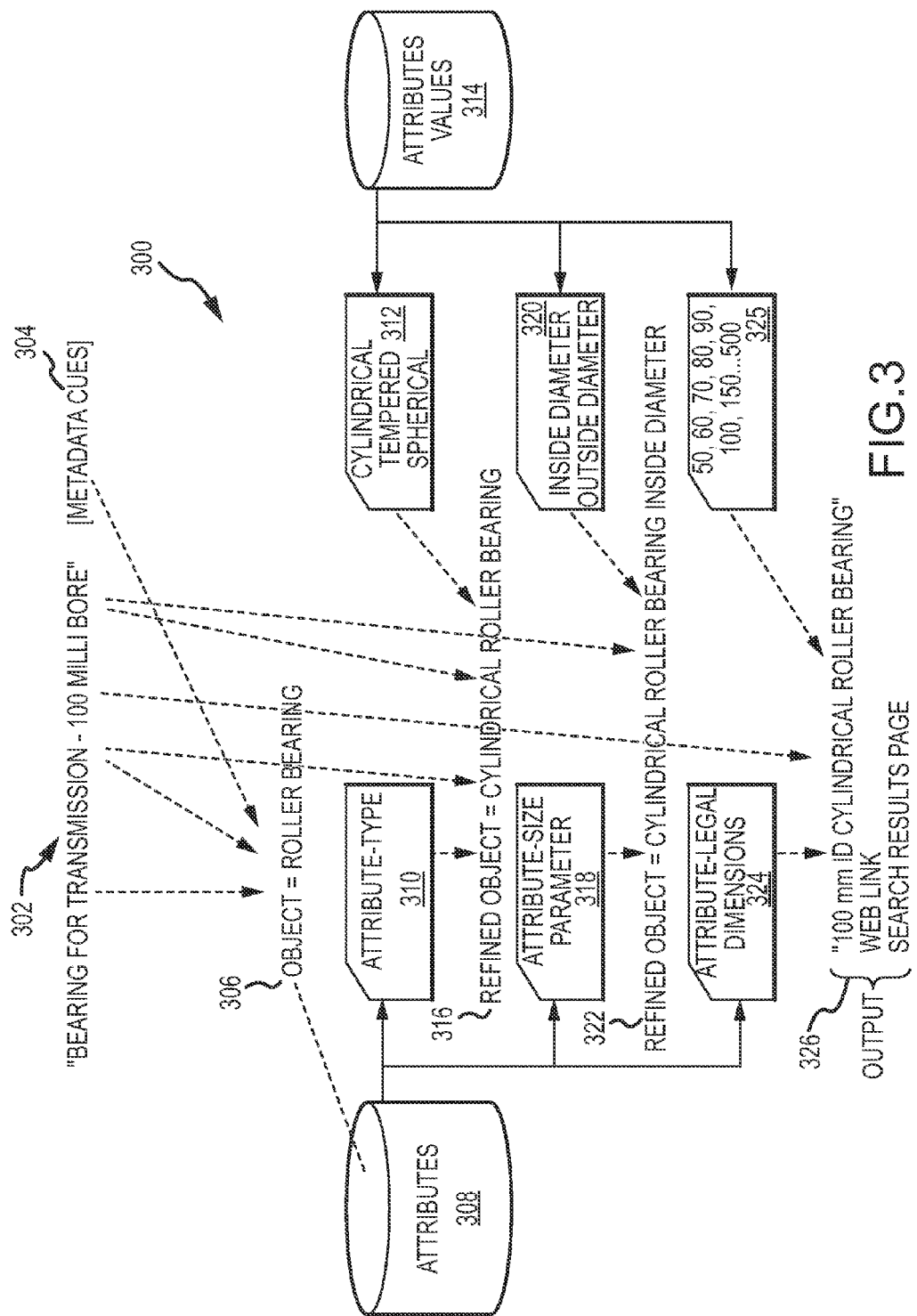
FIG. 3 is a schematic diagram showing an example of a conversion that may be implemented using the system of FIG. 1.

Referring to FIG. 3, a further example related to a frame-slot architecture 300 is illustrated. The architecture 300 is used to process a source string 302, in this case, "bearings for transmission-100 milli. bore." For example, this source string may be a record from a legacy information system or a search query. As discussed above, the processing of this source string 302 may utilize various contextual cues. As will be discussed in more detail below, such contextual cues may be derived from the content of the source string 302 itself. However, it is also noted that certain metadata cues 304 may be included in connection with the source string 302. In this regard, it is noted that legacy information systems such as databases may include a significant amount of structure that can be leveraged in accordance with the present invention. Such structure may be provided in the form of links of relational databases or similar tags or hooks that define data relationships. Such contextual information, which can vary substantially in form, is generally referred to herein as metadata.

The frame-slot architecture 300 is utilized to identify an object 306 from the source string 302. As noted above, this may involve identifying a term within the string 302 and comparing the term to a list of recognized objects or otherwise using logic to associate an input term with a recognized object. It will be noted in this regard that some degree of standardization or conversion which may involve the use contextual information may be performed in this regard. Thus, in the illustrated example, the identified object "roller bearing" does not literally correspond to any particular segment of the string 302. Rather, the object "roller bearing" is recognized from the term "bearing" from the string 302 together with contextual cues provided by the term "transmission" included within the content of the string 302 and, perhaps, from metadata cues 304. Other sources including external sources of information regarding bearings may be utilized in this regard by logic for matching the string 302 to the object 306.

Based on the object 306, information regarding attributes 308 and attribute values 314 may be accessed. As discussed above, such information may be derived from public and private schema. For example, an attribute type 310 may be identified for the object 306 and corresponding legal attribute values 312 may be determined. In this case, one attribute associated with the object "roller bearing" is "type" that has legal values of "cylindrical, tapered and spherical." The string 302 may be processed using this information to determine a refined object 316. In this case, the refined object is determined to be "cylindrical roller bearing." Again, it will be noted that this refined object 316 is not literally derived from the string 302 but rather, in the illustrated example, is determined based on certain contextual information and certain conversion processes. Thus, the string 302 is determined to match the attribute value "cylindrical" based on contextual information related to the terms "transmission" and "bore" included within the content of the source string 302. Information regarding the attributes 308 and attribute values 314 may again be accessed based on this refined object 316 to obtain further attributes 318 and associated attribute values 320. It should be noted that these attributes and attribute values 318 and 320, though illustrated as being dependent on the attribute 310 and attribute value 312 may alternatively be independent attributes and attribute values associated with the object 306. However, in the illustrated example, the attribute "size parameter" is associated with the legal values "inside diameter" and "outside diameter" based on the refined object "cylindrical roller bearings."

In this case, the attribute 318 and attribute value 320 are used together with certain contextual cues to define a further refined object 322. In this case, the further refined object 322 is defined as "cylindrical roller bearing inside diameter." A selection between the legal value "inside diameter" and "outside diameter" is made based on contextual information provided by the term "bore" included within the content of the string 302. Based on this further refined object 322, information regarding the attributes 308 and attribute values 314 can be used to identify a further attribute 324 and associated legal values 325. In this case, the attribute 324 is "legal dimensions" and associated legal values 325 are defined as "50, 60, 70, 80, 90, 100, 150 . . . 500." These values are assumed for the purposes of this example to be given in millimeters. In this case, the input string 302 is processed in view of the attribute 324 and legal values 325 to define an output 326 identified as "100 mm ID cylindrical roller bearings." In this regard, the string term "100 milli." is found to match the legal value of "100" for the attribute "legal dimensions" in the context of cylindrical roller bearings inside diameter. It will be appreciated that the term "milli." has thus been matched, based on a standardization or conversion process, to the designation "mm." It should be noted in this regard that success in matching the source term "100 milli." to the legal value "100 mm" provides further confidence was correctly and accurately performed.

Various types of outputs reflecting various conversion applications may be provided in this regard. Thus, in the case of converting an input file from a legacy database to an output form of a target information system, the input string 302 may be rewritten as "100 mm ID cylindrical roller bearing." In the case where the source string 302 represents a search query, the output may be provided by way of linking the user to an appropriate web page or including associated information in a search results page. It will be appreciated that other types of output may be provided in other conversion environments.

As noted above, the present invention may also implement a parse tree structure for conversion processes. Such conversion processes may relate, for example, to search systems or other information transformation systems as will be described below. Generally, such a search system may be operable in two modes: the set-up mode and the use mode. In the set-up mode, the user, who may be a subject matter expert or layman, performs a number of functions including accessing lists of potential search terms and/or source terms, developing a standardized set or set of terms, establishing a classification structure, associating the standardized terms with the classification structure and selectively transforming (e.g., translating) the terms as necessary.

Figure 7:
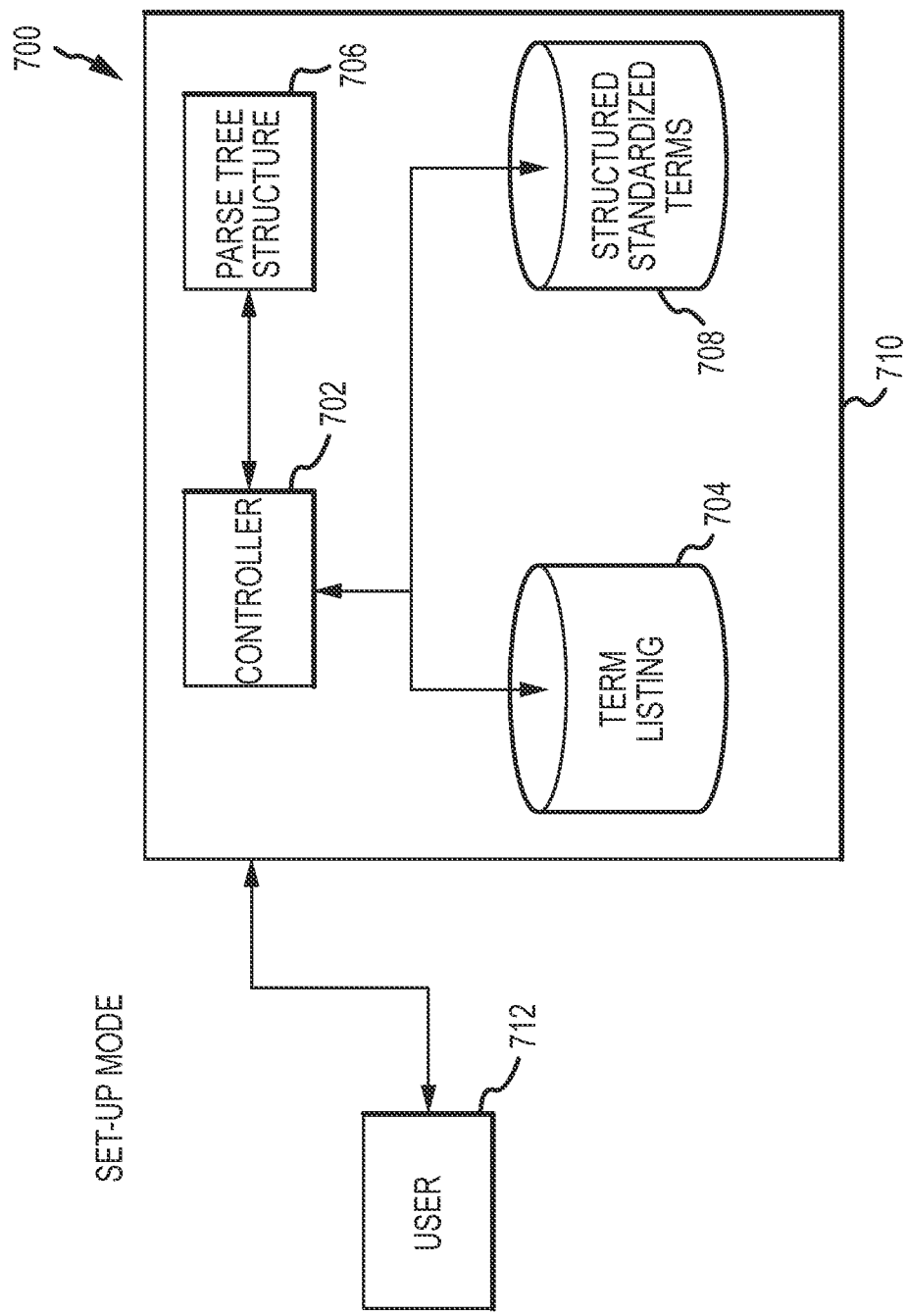
FIG. 7 is a schematic diagram illustrating set-up mode operation of a system in accordance with the present invention.

FIG. 7 is a schematic diagram of a search system 700, in accordance with the present invention, operating in the start-up mode. Generally, the system 700 includes a controller 702 and storage configured to store a term listing 704, a parse tree structure 706 and a set of structured standardized terms 708. Although the system 700 is illustrated as being implemented on a single platform 710, it will be appreciated that the functionality of the system 700 may be distributed over multiple platforms, for example, interconnected by a local or wide area network.

The user 712 uses the controller 702 to access a previously developed parse tree structure 706 or to develop the structure 706. In this regard, the parse tree structure 706 generally defines a number of classifications, each generally including one or more sub-classifications that collectively define the subject matter area. Examples will be provided below. The number of layers of classifications and sub-classifications will generally be determined by the user 712 and is dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

The user can then use the controller 702 to access a term listing 704 to be processed. As noted above, such a term listing 704 may include potential search terms, source terms from a source data collection or both. In the case of potential search terms, the terms may be obtained from a pre-existing list or may be developed by the user 712. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. Similarly, the source term listing may be previously developed or may be developed by the user 712. For example, in the context of online shopping applications, the source listing may be drawn from an electronic product catalog or other product database.

After accessing the term listing, the user may perform a number of functions including standardization and classification. Standardization refers to mapping of terms from the term listing 704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 704. It will be appreciated from the discussion below that such standardization facilitates execution of the searching functionality as well as transformation functions as may be desired in some contexts, e.g., translation.

The resulting list of standardized terms can then be mapped to the parse tree structure 706. As will be described below, this can be executed via a simple drag and drop operation on a graphical user interface. Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 706. For example, these relationships may be reflected in an XML tag system or other metadata representation associated with the term. The resulting structured standardized terms are then stored in a storage structure such as a database.

Figure 8:
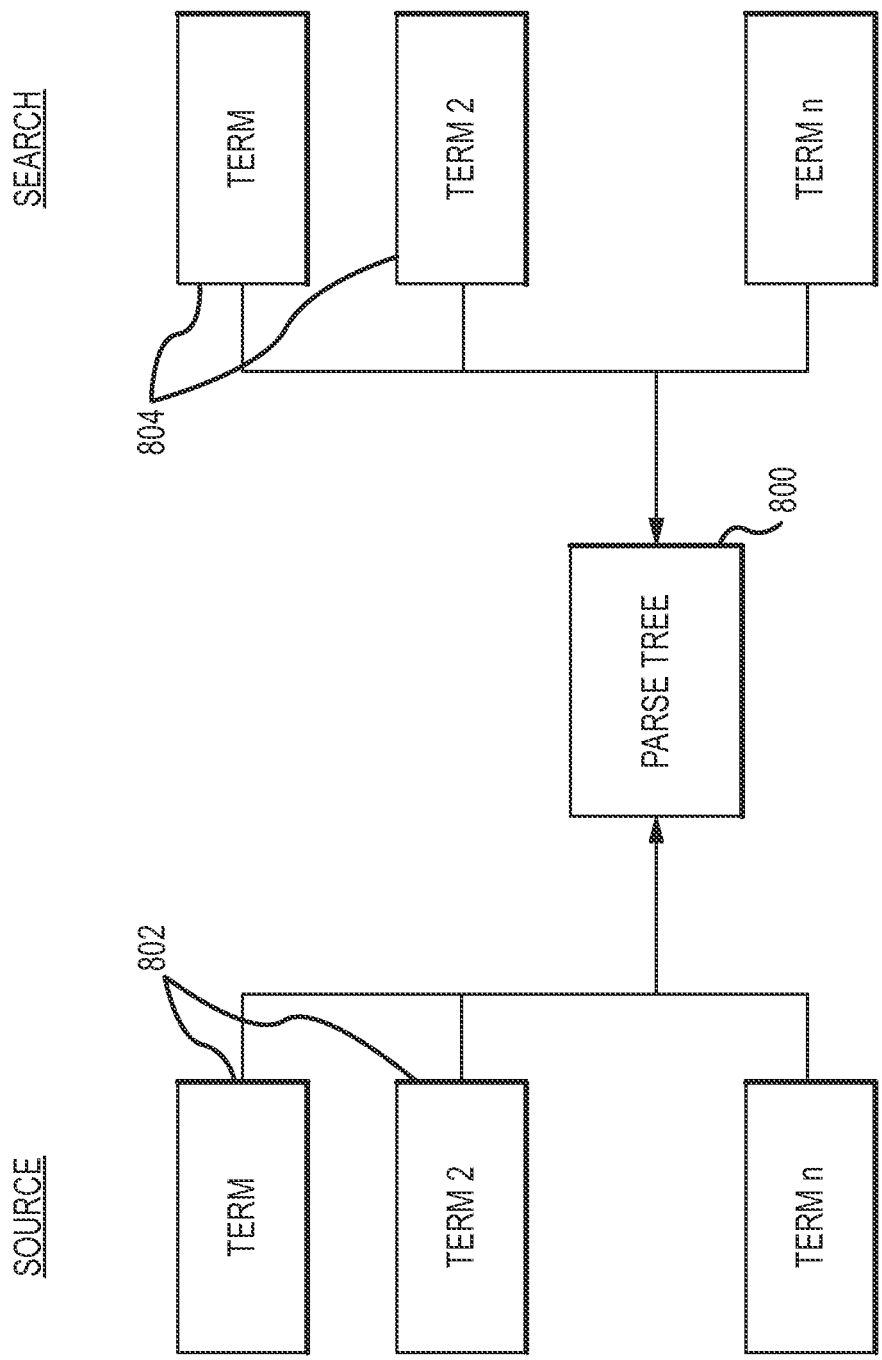
FIG. 8 is a schematic diagram illustrating a search application implemented in accordance with the present invention.

It will thus be appreciated that, in the illustrated embodiment, both source terms and potential search terms may be mapped to elements of the same parse tree structure. This is shown in FIG. 8. As shown, multiple terms 802 from the source collection are mapped to the parse tree structure 800. Similarly, multiple terms from the potential search term listing 804 are mapped to corresponding elements of the parse tree structure 800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 802 or 804 with more than one classification or classification lineage of the parse tree 800. This may have particular benefits in connection with matching a particular product or product category to multiple potential search strategies, e.g., mapping "pen" to searches including "writing instrument" or "office gift."

Figure 9:
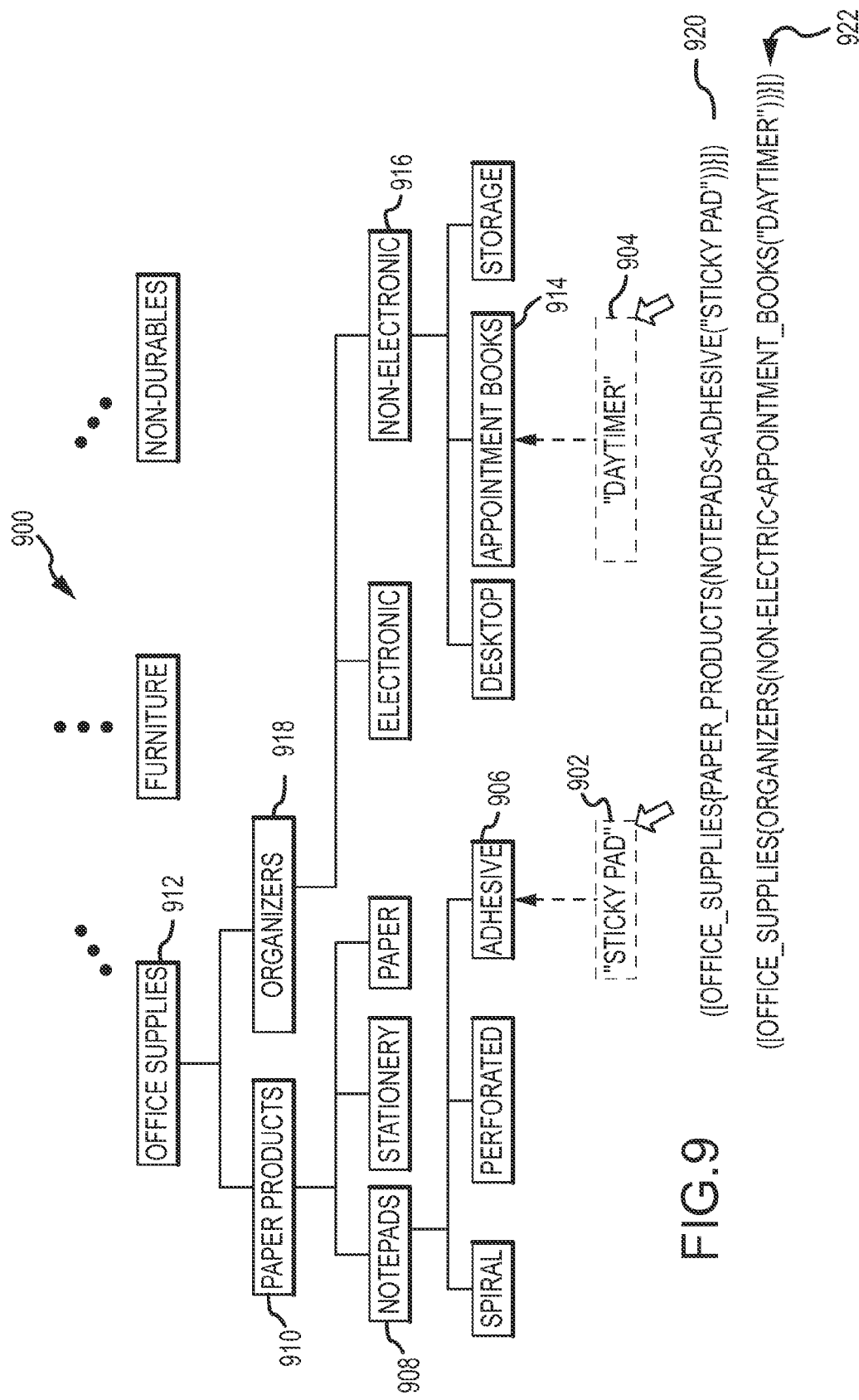
FIGS. 9 and 10 illustrate a classification system in accordance with the present invention.

An example of this process is shown in FIG. 9 with respect to particular search terms. In particular, FIG. 9 shows a user interface representing a portion of a parse tree 900 for a particular subject matter such as the electronic catalog of an office supply warehouse. In this case, the user uses the graphical user interface to establish an association between search terms 902 and 904 and the parse tree 900. Specifically; search term 902, in this case "sticky pad" is dragged and dropped on the node 906 of the parse tree 900 labeled "Adhesive." This node 906 or classification is a sub-classification of "Notepads" 908 which is a sub-classification of "Paper Products" 910 which, finally, is a sub-classification of "Office_Supplies" 912. Similarly, term 904, in this case "Daytimer," is associated with classification "Appointment_Books" which is a sub-classification of "Non-electronic" 916 which, in turn, is a sub-classification of "Organizers" 918 which, finally, is a sub-classification of "Office_Supplies" 3912. Data strings 920 and 922 illustrate the resulting structured terms reflecting the classification relationships (other syntax, such as standard XML tag syntax, may be used to reflect the classification structure). It will be appreciated that the example of FIG. 9 omits the optional step of term standardization. That is, the potential search term "Sticky Pad" may alternatively first be mapped to a standardized term such as "Post-it note" before being associated with the parse tree. Such standardization will be described in more detail below.

Figure 10:
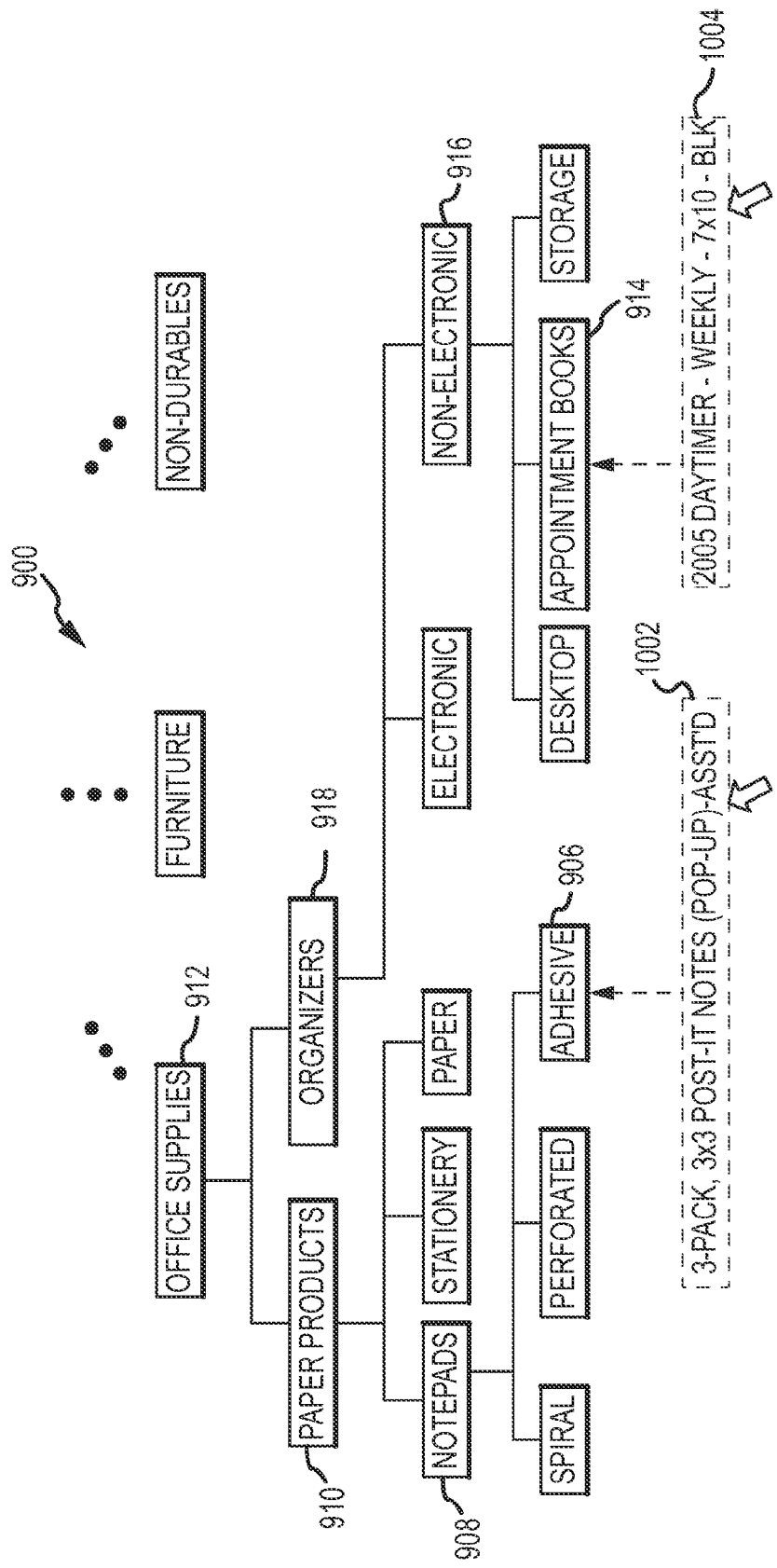

FIG. 10 illustrates how the same parse tree 900 may be used to associate a classification with items from a, source collection. For example, such a source collection may be drawn from an electronic catalog or other database of the business. In this case, the source term 1002 denoted "3-pack, 3×3 Post-it notes (Pop-up)-Asst'd" is associated with the same node 906 as "Sticky Pad" was in the previous example. Similarly, term 1004 denoted "2005 Daytimer-Weekly-7×10-Blk" is associated with the same node 914 as potential search term "Daytimer" was in the previous example. As will be appreciated from the discussion below, such common associations with respect to the parse tree 900 facilitate searching.

Figure 11:
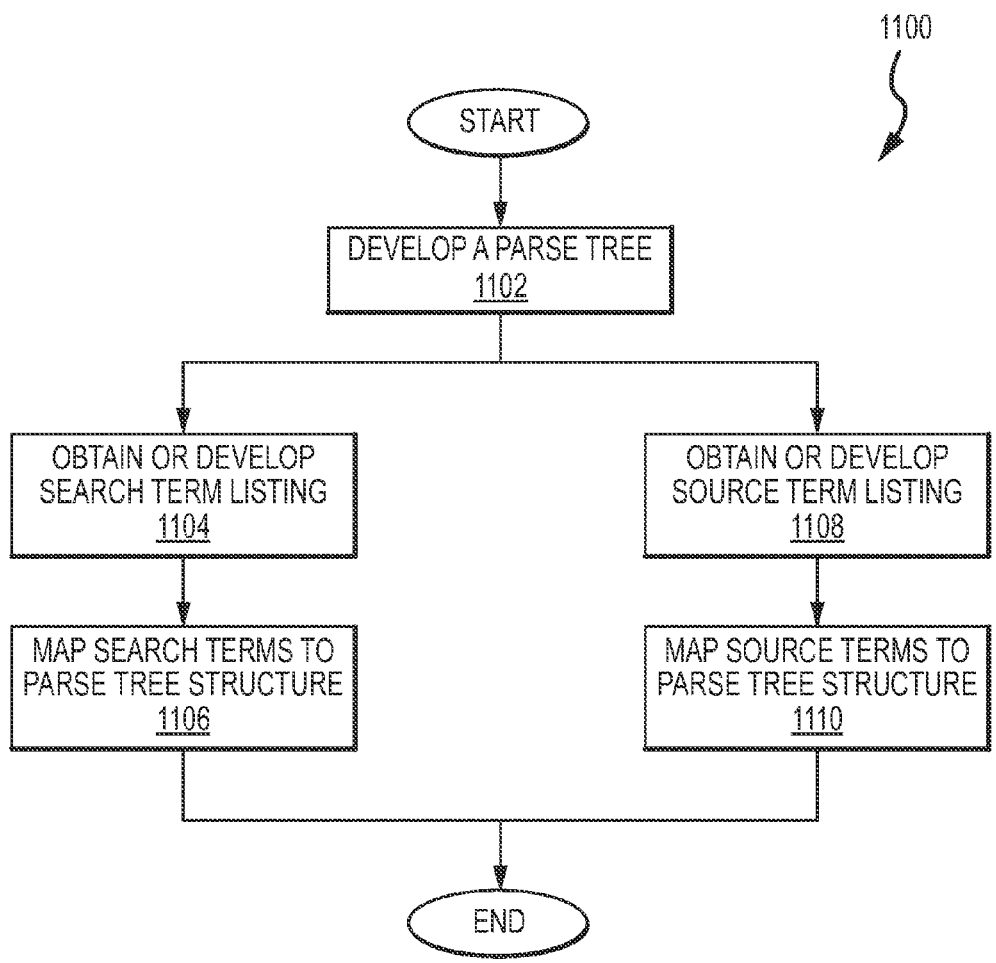
FIG. 11 is a flow chart illustrating a process for establishing a parse tree structure in accordance with the present invention.

This process for establishing a knowledge base may be summarized with respect to the flow chart of FIG. 11. The illustrated process 1100 is initiated by developing (1102) a parse tree that defines the subject matter of interest in terms of a number of classifications and sub-classifications. As noted above, such parsing of the subject matter may be implemented with enough levels to divide the subject matter to the desired granularity. The process 1100 then proceeds on two separate paths relating to establishing classifications for potential search terms and classifications for items from the source collection. It will be appreciated that these two paths may be executed in any order or concurrently. On the potential search term path, the process involves obtaining or developing (1104) a potential search term listing. As noted above, an existing list may be obtained, a new list may be developed by a subject matter expert, or some combination of these processes may occur. The terms are then mapped (1106) to the parse tree structure such as by a drag and drop operation on a graphical user interface as illustrated above. On the source term process line, the process 1100 proceeds by obtaining or developing (1108) a source term listing. Again, the source term listing may be obtained from existing sources, developed by subject matter expert or some combination of these processes may occur. The individual terms are then mapped (1110) to the parse tree structure, again, for example, by way of a drag and drop operation as illustrated above. Although not shown, the process 1100 may further include the steps of re-writing the potential search terms and source terms in a standardized form.

Figure 12:
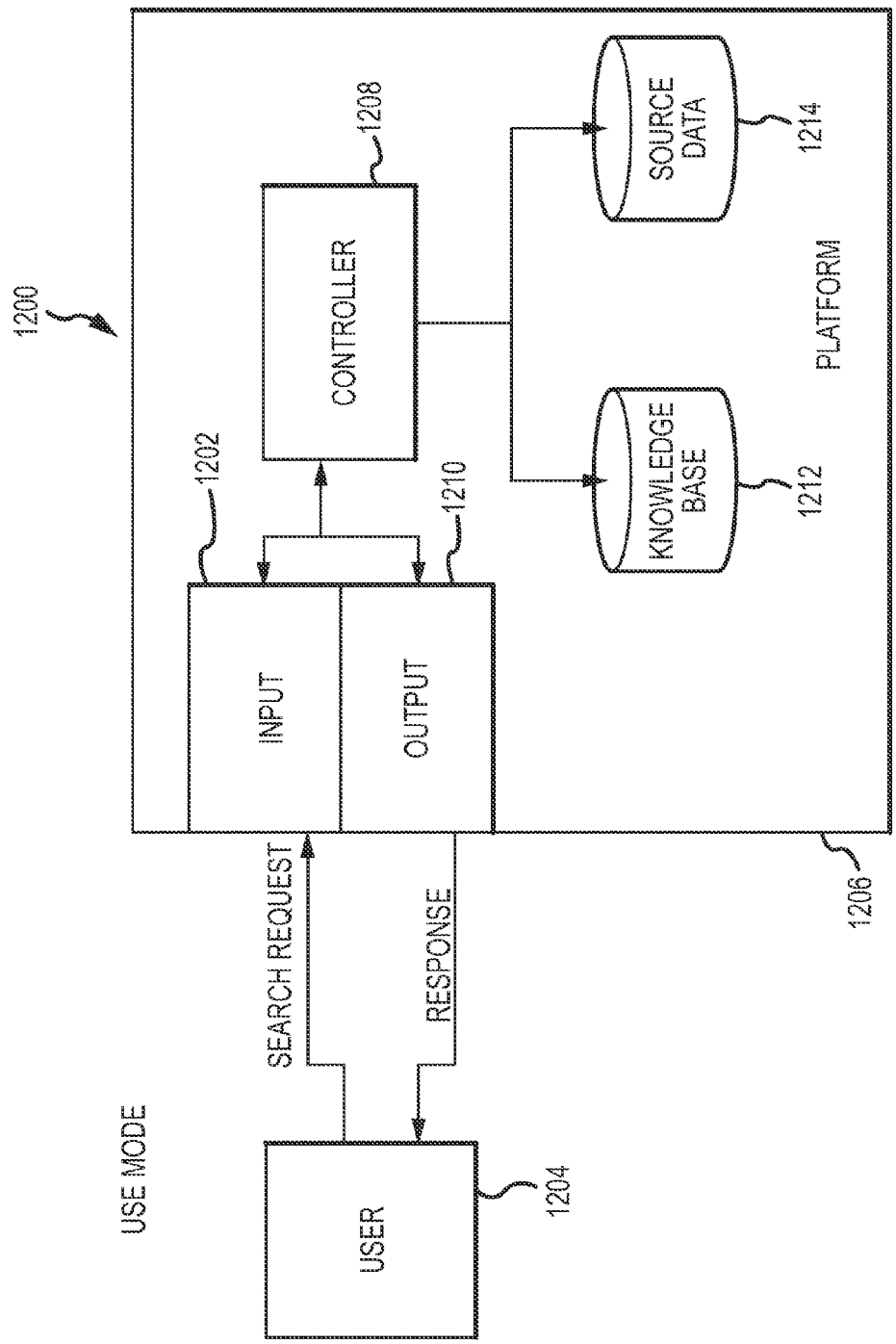
FIG. 12 is a schematic diagram illustrating a system for implementing a search application in accordance with the present invention.

The search system of the present invention is also operative in a use mode. This is illustrated in FIG. 12. The illustrated system 1200 includes input structure 1202 for receiving a search request from a user 1204. Depending on the specific network context in which the system 1200 is implemented, the search request may be entered directly at the machine executing the search system, or may be entered at a remote node interconnected to the platform 1206 via a local or wide area network. The nature of the input structure 1202 may vary accordingly. The search request is processed by a controller 1208 to obtain responsive information that is transmitted to the user 1204 via output structure 1210. Again, the nature of the output structure 1210 may vary depending on the specific network implementation.

In the illustrated implementation, in order to obtain the responsive information, the controller accesses the knowledge base 1212. The knowledge base 1212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 1214.

Figure 13:
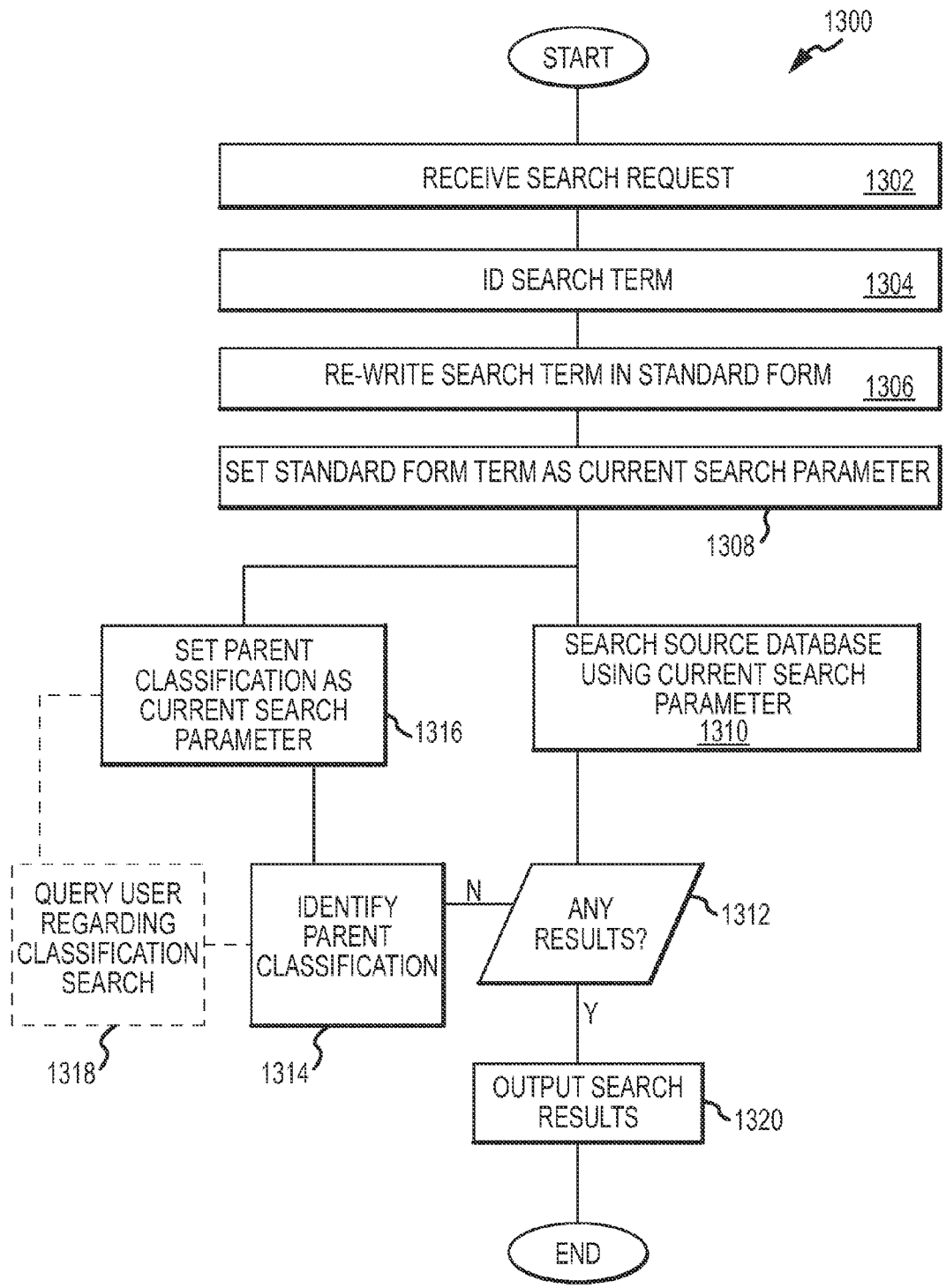
FIG. 13 is a flow chart illustrating a process that may be implemented by the system of FIG. 12.
Figure 14:
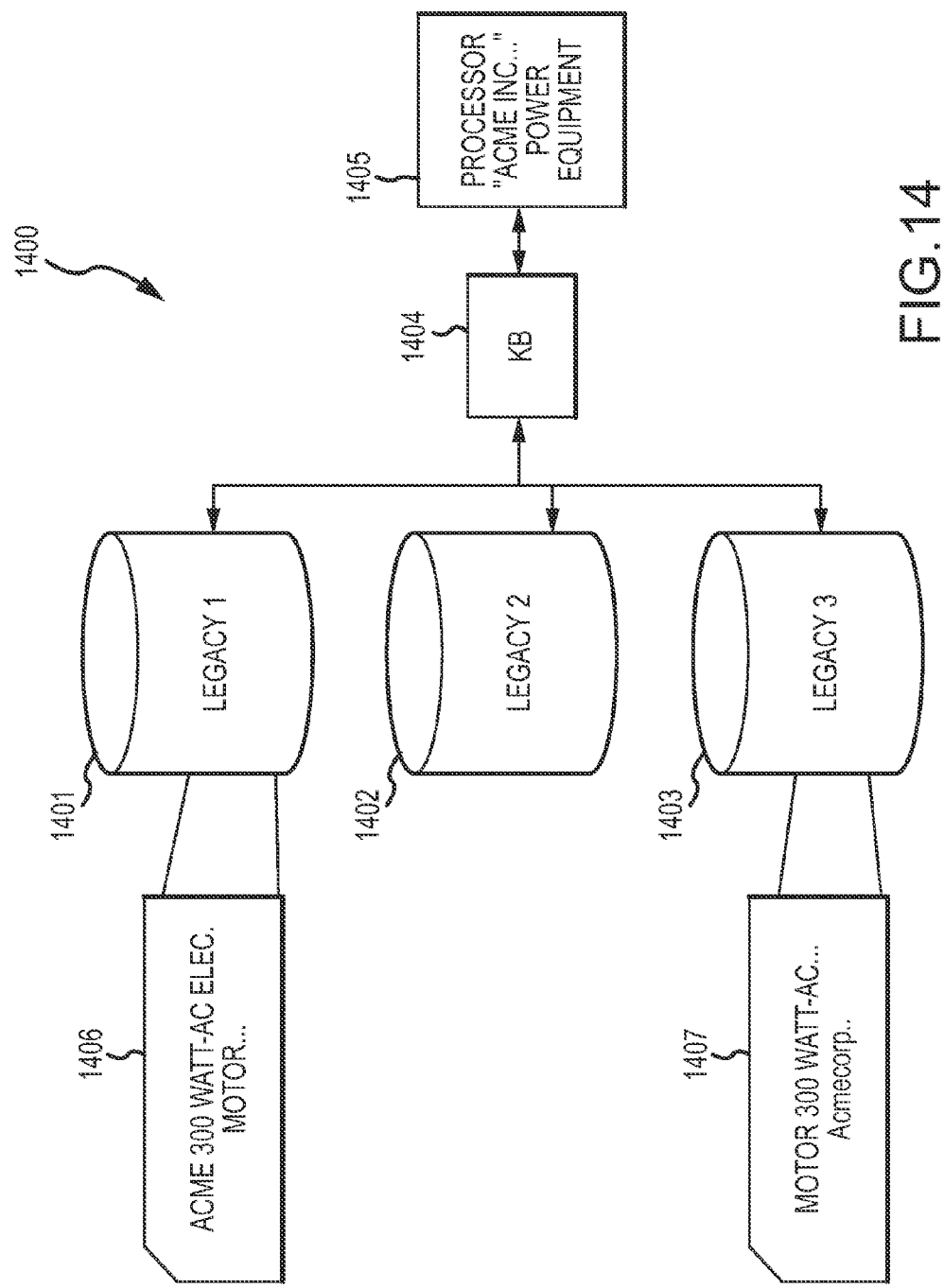
FIG. 14 is a schematic diagram illustrating a system using a knowledge base to process legacy information in accordance with the present invention.

FIG. 13 is a flow chart illustrating a corresponding process 14300. The process 100 is initiated by receiving (1302) a search request, for example, from a keyboard, graphical user interface or network port. The system is then operative to identify (1304) a search term from the search request. In this regard, any appropriate search query syntax may be supported. For example, a search term may be entered via a template including predefined Boolean operators or may be entered freeform. Existing technologies allow for identification of search terms thus entered.

The search term is then rewritten (1306) in standard form. This may involve correcting misspellings, mapping multiple synonyms to a selected standard term, implementing a predetermined syntax and grammar, etc., as will be described in more detail below. The resulting standard form term is then set (1308) as the current search parameter.

In the illustrated implementation, the search then proceeds iteratively through the hierarchy of the parse tree structure. Specifically, this is initiated by searching (1310) the source database using the current search parameter. If any results are obtained (1312) these results may be output (1320) to the user. If no results are obtained, the parent classification at the next level of the parse tree is identified (1314). That parent classification is then set (1316) as the current search parameter and the process is repeated. Optionally, the user may be queried (1318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

It will be appreciated that searching functionalities such as discussed above is not limited to searching of a web site or electronic catalog by outside parties but is more generally useful in a variety of searching and database merging environments. FIG. 44 illustrates a system 1400 for using a knowledge base 1404 to access information from multiple legacy databases 1401-1403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 1406 of a first legacy database 1401 reflects a particular convention for identifying a manufacturer ("Acme") and product ("300W AC Elec. Motor . . ."). Record 1407 associated with another legacy database 1403 reflects a different convention including, among other things, a different identification of the manufacturer ("AcmeCorp") and a misspelling ("Moter").

In this case, an internal or external user can use the processor 1405 to enter a substantially freeform search request, in this case "Acme Inc. Power Equipment." For example, such a search request may be entered in the hopes of retrieving all relevant information from all of the legacy databases 1401-1403. This is accommodated, in the illustrated embodiment, by processing the search request using the knowledge base 1404. The knowledge base 1404 executes functionality as discussed above and in more detail below relating to standardizing terms, associating terms with a classification structure and the like. Thus, the knowledge base 1404 may first process the search query to standardize and/or classify the search terms. For example, Acme, Inc. may be associated with the standardized term "Acme." The term polar equipment may be associated with the standardized term or classification "motor." Each of these terms/classifications may in turn be associated with associated legacy forms of the databases 1401-1403 to retrieve responsive information from each of the databases. Additional conventional functionality such as merge functionality may be implemented to identify and prioritize the responsive information provided as search results to the processor 1405. In this manner, searching or merging of legacy data systems is accommodated with minimal additional code.

From the discussion above; it will be appreciated that substantial effort is involved in transforming data from one form to another, e.g., from a raw list of potential search or source terms to a set or sets of standardized, classified and, perhaps, translated terms. The present invention also accommodates sharing information established in developing a transformation model such as a semantic metadata model used in this regard. Such sharing of information allows multiple users to be involved in creating the knowledge base, e.g., at the same time, and allows components of such information to be utilized in starting new knowledge base creation projects. This functionality is described in detail in U.S. patent application Ser. No. 10/970,372 which is incorporated herein by reference in its entirety.

2. Self-Learning Tool

As described above, the conversion process utilizes certain subject matter context reflected in a single record to assist in recognizing terms, making accurate conversions and identifying anomalies. This requires development of a substantial knowledge base regarding the subject matter context. For example, in the frame-slot architecture described above, elements of this knowledge base are reflected in the definition of the frames as well as the rules defining attributes and acceptable or required attribute values. However, in some cases, developing this knowledge base involves a significant time investment and subject matter cues may be difficult to extract from a string of text considered in isolation.

The self-learning tool can perform an analysis on training data including many files or strings of text so as to provide substantial automation of term and phrase recognition. This is described below in relation to an example involving a large collection of product descriptors all relating to antiperspirant (or deodorant). Such a data collection may be obtained, for example, from legacy data systems of a large retailer. It may be desired to simply recognize the descriptors, to match the descriptors to a search query, to re-write the descriptors in a more structured and standardized form into a master database, e.g., for improved inventorying and searching, or to perform other conversion processes.

In the following description, a specific implementation is described where some initial processing is performed, for example, using a system as described above, to identify records related to antiperspirant and to identify a subset of those records for use as training data. This provides some initial knowledge base information, for example, identifying at least a partial set of attributes. In some cases, a more complete ontology may have been developed, for example, by defining a parse tree and related frame-slot structure. Thereafter, statistical processing is performed on the training data to progressively supplement the knowledge base with statistical information. The resulting knowledge base can be used to convert new files and those new files can be used to update the statistical information of the knowledge base. Though the invention is described in this specific context, it will be appreciated that the invention can be employed in other conversion environments and can be implemented in other manners, including implementations where the data frame is not given but is inferred from the data.

In many cases, an entity such as a retailer can supply a large group of records including records related to the same subject matter (e.g., antiperspirant items) as well as other items. Such records may be collected from a variety of legacy data systems and, typically, are not standardized with regard to abbreviations, syntax and the like used to describe the products. In some cases, such an entity may have some amount of records that are standardized. For example, one of the legacy systems may have data that is fully attributed and internally consistent with respect to abbreviations, syntax and the like. Alternatively, with minimal training, a system as described above may be able to process the records from the legacy systems so as to recognize and standardize some number of those records.

Figure 16:
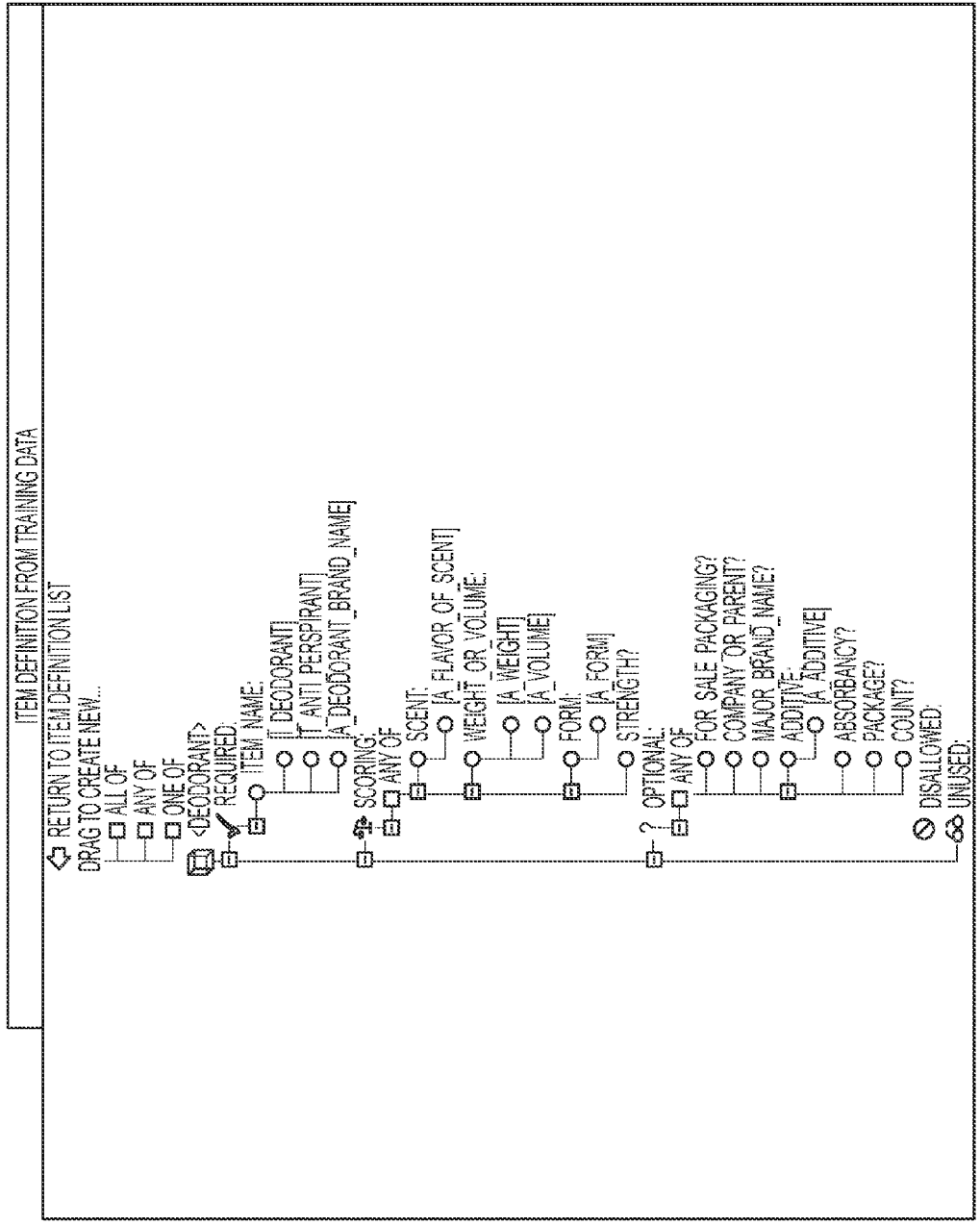
FIG. 16 is a user interface screen showing an item definition parse tree developed from the training data of FIG. 15.

In one exemplary case, an entity provided over 63,000 records of non-standardized deodorant items together with records for other types of items. In addition, the system of the present invention received about 2,500 records of deodorant items that were fully attributed and standardized. A sampling of such records is shown in FIG. 15. As shown, each record includes a number of attributes and all required attribute values are populated with standardized information. FIG. 16 shows a user interface screen reflecting an associated parse tree segment for these products developed from the standardized data. The parse tree structure generally corresponds to that described above in the first section of this detailed description. The system as described above has been found to be quite successful in identifying the non-standardized records. In this case, such a system was effective in identifying over 58,000 of the non-standardized records as antiperspirant products. This results in significant efficiencies in relation to prior art systems. However, over 5,000 antiperspirant records were not recognized and some records not associated with antiperspirant products were misidentified. It will be appreciated that those unrecognized and misidentified records could be addressed by an operator through a process of manually addressing the records or developing additional rules to recognize additional records. However, this process involves significant effort and therefore involves additional time and expense.

The difficulties presented by these non-standardized product descriptors is illustrated by the following exemplary deodorant product descriptor: OS RD ZN SPRT 2.6Z. It will be appreciated that it is difficult for the system described above to parse this record into identifiable terms. Indeed, the data is so complex that the system described above may have using any surrounding context within the record for guidance. However, it has been found that such seemingly intractable files may be more readily resolved when the consideration of subject matter context is expanded from a single file to include multiple files. FIG. 17 illustrates a set of related files. Upon consideration of such a set of files, a human observer can recognize many terms that are not readily recognized when an individual file is considered in isolation.

The invention as described below provides similar capabilities to a machine tool. Specifically, by analyzing a larger set of data, the tool is able to recognize individual terms and phrases that would be difficult or substantially impossible to recognize based on consideration of a single record. In particular, the system described below automates acquisition of terms and phrases. With regard to terms, the system can predictively (without reference to pre-established rules) match a new term to a standardized term that has been defined by an existing rule or automatically based on analysis of a sample data set. Similarly, phases can be identified in input records and associated with existing ontologics.

Figure 18:
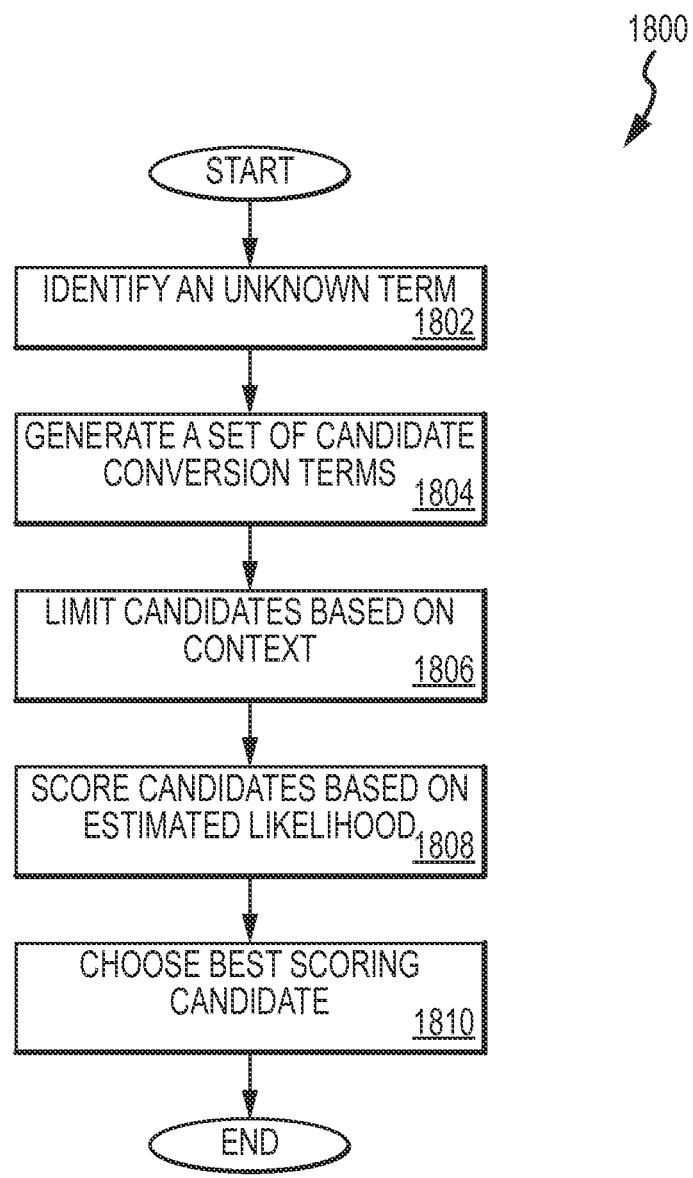
FIG. 18 is a flow chart illustrating a process for converting an input data string in accordance with the present invention.

The general form of the process 1800 is illustrated in FIG. 18. The process is initiated by identifying (1802) an unknown term. Specifically, an input string such as a product descriptor file is parsed as described above. Individual terms are then analyzed using existing rules for matching input terms to standardized full forms. Thus, if a particular abbreviation is already known (e.g., "oz." means "ounce"), that abbreviation can be mapped directly to the standardized full form. In this manner, one or more terms of the input sting may be determined. Any remaining terms are identified as unknown terms subject to further processing in accordance with the illustrated process 1800.

For a given unknown term, a set of candidate conversion terms is then generated (1804). In this regard, an orthographic transformation algorithm can be utilized to compare the unknown term to known terms in a dictionary. This type of algorithm is well-known and is used, for example, in connection with search engines and spell check functions of word processing systems. Generally, such algorithms identify potential matches to a term under consideration and associated probabilities by the number and magnitude of changes required to complete a transformation between the term under consideration and a given candidate term from the dictionary. For example, a term from the dictionary that differed from the term under consideration by only one letter may be deemed as a more likely match than a term from the dictionary that differed from the term under consideration by two letters. Such dictionaries employ a variety of rules to address missing letters and common abbreviations and transformations.

If no information is available regarding the context of the unknown term, a general dictionary or the most general dictionary applicable to the conversion process may be used to generate the set of candidate conversion terms. However, in accordance with the present invention, such an algorithm may be tailored to the conversion process. For example, the dictionaries as well as the rules for rating the probabilities of the transformation may be application specific. Thus, as noted above, in many cases the unknown term may be part of an input string that includes a number of recognized terms. Moreover, in some cases, the subject matter context of the unknown term may be provided by a user. In such cases, the candidate conversion terms may be generated from a dictionary specific to that subject matter context. For example, if the frame of the data has been given or inferred, the candidate terms may be generated from a dictionary specific to that frame. Moreover, statistical information obtained by analysis of sample data may be used in establishing probabilities for the transformations.

It will thus be appreciated that the candidate terms, as generated, may be limited based on some subject matter information. However, the candidates may be further limited (1806) based on a variety of additional context information. For example, if the term under consideration is part of an input string including known terms, those known terms can be used to identify likely patterns. Thus, if an item has been identified from the input string, then a list of attributes corresponding to that item may be available. By analyzing the input string, missing attributes can be identified as likely candidates. Similarly, based on known rules of a frame-slot architecture, it may be determined that the term under consideration is associated with a valid attribute value. That association may provide a cue that serves to limit the candidates for the term under consideration.

The remaining candidates can then be scored (1808) based on an estimated likelihood for each candidate that it corresponds to the term under consideration. In one implementation, this is based on a statistical analysis. A variety of information relevant to a statistical analysis may be available. For example, as noted above, the orthographic transformation algorithm may yield probability information related to the number and magnitude of changes required in connection with a transformation between the term under consideration and a dictionary term. This provides transformation probability information.

In addition, various items of evidence can be inferred from the subject matter context that impact such a statistical analysis. For example, a set of sample data may be analyzed to obtain information regarding the frequency of occurrence of different terms. This analysis may be based on the full set of sample data or on a subset of sample data corresponding to a known or inferred frame of the input string. Candidate terms associated with a higher frequency of occurrence within the relevant data set would generally be attributed a higher probability in this regard. It will be appreciated that such frequency information may be updated as unknown terms are recognized.

In addition, the probability associated with a candidate term may be affected by the context of the input string. Thus, if a product or item of the input string has been identified, and that product or item is associated with a known set of attributes, a candidate term associated with those attributes may be assigned a higher probability. Similarly, if the candidate term is associated with an attribute missing from the input string, the probability associated with that candidate term will generally increase. Conversely, if an attribute has already been identified in the input string, an associated candidate term may be eliminated or its probability decreased.

Moreover, the probability associated with a candidate term may be affected by a pattern matching analysis. For example, a syntax analysis may indicate that antiperspirant product descriptors frequently include a product name at or near the start of a descriptor or frequently include a size attribute at or near the end of the product descriptor (similarly, the dimensions of a flat bar, as discussed above, may typically be given by the sequence length, then width, then thickness). In this regard, the position of the term under consideration in relation to the input string or in relation to previously recognized attributes or attribute values may have an impact on the probability values. It will thus be appreciated that a variety of types of information, which will vary from application to application, may be available for statistical analysis.

Any suitable statistical analysis for generating a probability score based on the available statistical information may be utilized. In a preferred implementation, a Bayesian algorithm or Markov chain algorithm is employed. Generally, these techniques progressively update an estimated probability based on a series of pieces of evidence or observations. Specifically, the form of a Bayesian inference process in this context may be as follows:

$$P(V_0|V,\text{frame})=P(V|V_0,\text{frame})P(V_0,\text{frame})/P(V,\text{frame})$$

In this regard, the posterior probability $P(V_0/V)$ may be directly computed. Alternatively, since $P(V)$ is constant over all candidates, the value of $P(V|V_0)P(V_0)$ can be used to score the candidates. More particularly, the term $P(V|V_0)$ can be estimated by modeling the relationship between the candidate term and the term under consideration as a sequence of orthographic changes, as discussed above. In a preferred implementation, the probabilities associated with these orthographic transformations are learned from analysis of other data such as a set of sample data.

The probability associated with the term $P(V_0)$ may be estimated from contextual information, as discussed above, such as the frequency of occurrence of the candidate term in the sample data. It will thus be appreciated that a variety of information may be relevant to the statistical analysis. Each item of such information can be processed as a piece of evidence or observation in the noted Bayesian inference process. Each piece of evidence will have an impact on the prior or existing probability. This process continues until all relevant evidence has been processed. At the conclusion of this process, the final, posterior probability value may be used as the probability score for that candidate term. This process is executed for each of the candidate terms such that a probability score is obtained for all candidates. The best scoring candidate is then chosen (1810) for the conversion process.

Although the above discussion assumed that the statistical analysis was being conducted on a term-by-term basis, it will be appreciated that the analysis may be conducted for phrases or other chunks of input data. Similar orthographic transformation probability information and context probability information such as pattern recognition information can be utilized to score candidates and select the best scoring candidate. Moreover, as one term in an input string is recognized, that term may have an impact on the analysis of another unknown term of that input string. Accordingly, probabilities may be adjusted and processes may be performed iteratively to simultaneously resolve multiple unknown terms. Similarly, as syntax and spelling may vary simultaneously, multi-dimensional pattern recognition may be implemented. Thus, it will be appreciated that the process may be nonlinear in various respects.

It will be appreciated that user feedback may be used to improve confidence in the system. Thus, for example, as the statistical process recognizes individual terms, phrases or full records, those items may be flagged for review by a user. The user can verify the accuracy of those terms and report errors. This information can be used by the statistical analysis tool to update probability values. Generally, the statistical process may either be pulled, i.e., requested by a user, or pushed, i.e., automatically executed.

Figure 19:
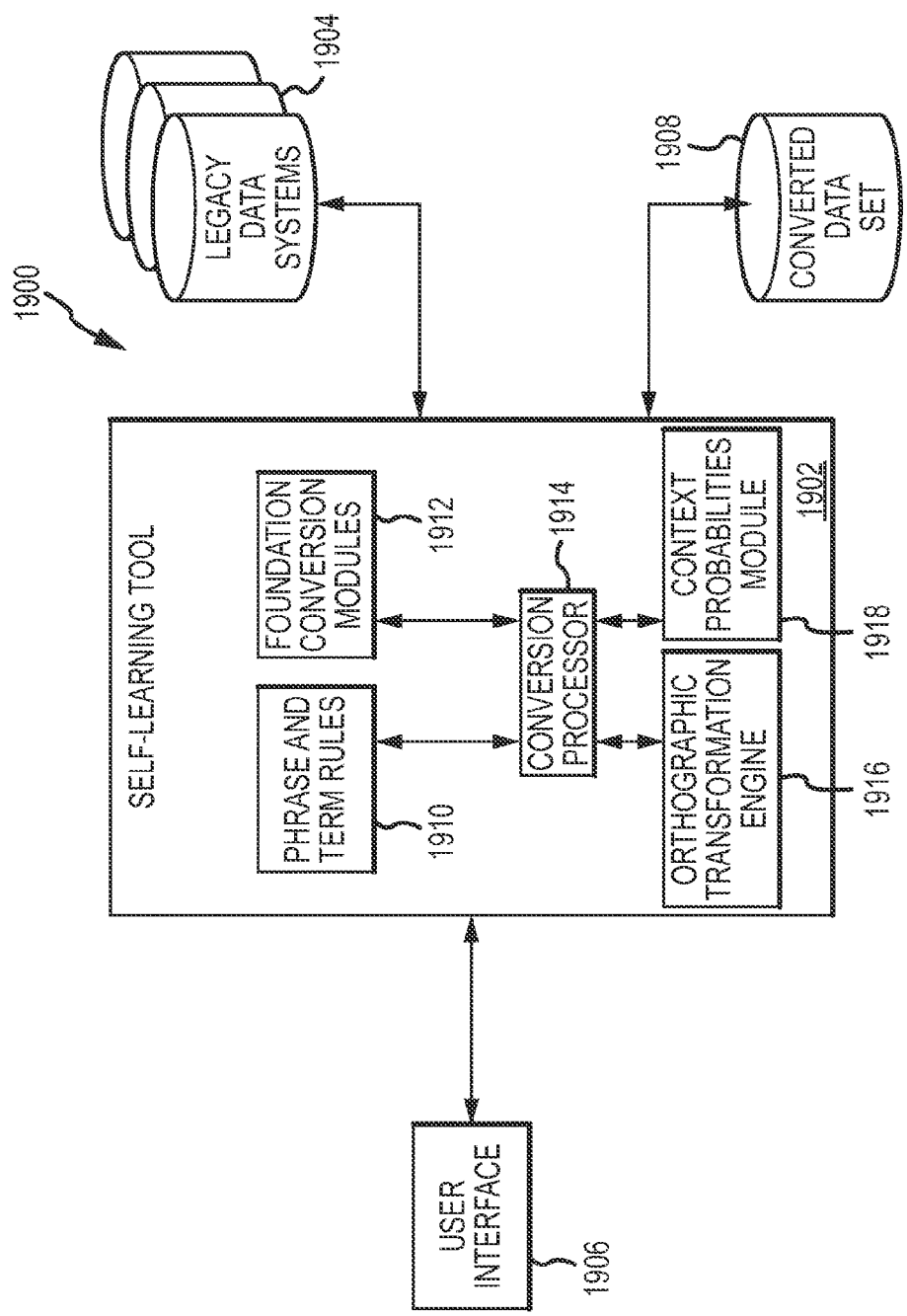
FIG. 19 is a block diagram of a self-learning conversion tool in accordance with the present invention.

FIG. 19 shows a schematic diagram of a conversion system 1900 in accordance with the present invention. The conversion system 1900 includes a self-learning tool 1902 having functionality as described above. The self-learning tool 1902 receives input files from legacy data systems 1904. This input information may include, for example, product descriptors and, perhaps, a set of fully attributed and normalized sample data. A user can interact with the self-learning tool 1902 via the user interface 1906. In this manner, the user can define rules, identify existing conversion modules for reuse and enter other appropriate commands. The output from the self-learning tool 1902 in the illustrated embodiment is a converted data set 1908. For example, the converted data set may be fully attributed and normalized data corresponding to the full content of the legacy data systems 1904. It will be appreciated that, in certain conversion processes, such a converted data set 1908 may be an intermediate form in the conversion process. For example, it may ultimately be desired to map the converted data set 1908 to a further data base or match individual items of converted data to a search query or the like. In such cases, the converted data set 1908 may be a useful intermediate form.

The illustrated self-learning tool 1902 includes a conversion processor 1914 for executing conversion logic as described above. The conversion processor 1914 can access a set of phrase and term rules 1910. For example, these phrase and term rules 1910 may define a parse tree structure, frame-slot architecture and other conversion rules developed for a specific conversion application or having more general applicability.

The conversion processor 1914 can also access certain foundation conversion modules 1912. As noted above, some conversion rules may have application beyond a single conversion process and can be reused in subsequent conversion applications. For example, a variety of standard abbreviations may be defined for weights, measures and other attributes. Such rules may be included in the foundation conversion modules 1912.

The illustrated self-learning tool 1902 further includes an orthographic transformation engine 1916. As discussed above, such an engine may execute algorithms for matching a term under consideration to a number of candidate conversion terms. In addition, the engine may associate probabilities with each such candidate conversion term based, for example, on the number and magnitude of changes required to accomplish the transformation. As discussed above, such algorithms may be general algorithms or may be tailored to the specific conversion process. The engine 1916 can be accessed by the conversion processor 1914 so as to obtain probability information for use in the statistical analysis.

Additional statistical information is provided by the context probability module 1918. As discussed above, a set of sample data can be analyzed to obtain a variety of statistical information related to frequency of term usage, patterns of term usage, phrasing ontologies and the like. The conversion processor 1914 can access such information to perform the statistical analysis.

While various embodiments of the present invention have been described in detail, it is apparent that further modifications and adaptations of the invention will occur to those skilled in the art. However, it is to be expressly understood that such modifications and adaptations are within the spirit and scope of the present invention.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed:

1. A computer-implemented method for automatically generating an index in a database system, the method comprising the steps of:

receiving raw data that includes human directed information;

processing the raw data into a standardized format of a first form to produce standardized data, wherein the standardized format of the first form comprises at least one of a standardized attribute or standardized attribute value corresponding to the raw data and includes information about a plurality of standardized attributes having a hierarchical structure;

generating a plurality of identifiers for the standardized data based on an attribute or attribute value of the raw data, wherein the plurality of identifiers are in a second form different than the first form, and wherein the plurality of identifiers encode the hierarchical structure of the plurality of attributes of the standardized data in the first form;

storing the plurality of identifiers and the standardized data in a data storage structure, wherein the standardized data in the first form is indexed with respect to the plurality of identifiers in the second form, and wherein the identifiers in the second form occupy less memory of the data storage structure than would the corresponding standardized data in the first form to which the identifier is indexed; and performing a search of one of a database and a network using said plurality of identifiers to locate a subset of said standardized data, said performing a search comprising:

receiving raw search data from a searching entity;

processing the raw search data into standardized search data that includes information about an attribute or attribute value;

retrieving the subset of the standardized data using the plurality of identifiers; and providing a representation of the subset of the standardized data to said searching entity.

2. The computer-implemented method of claim 1, wherein the raw data comprises one of a product and a service or parts list.

3. The computer-implemented method of claim 1, wherein said plurality of identifiers encodes an attribute and an attribute value of said standardized data.

4. The computer-implemented method of claim 1, wherein each of said plurality of identifiers comprises an integer.

5. The computer-implemented method of claim 1, wherein the processing step comprises utilizing standardization rules to convert the received data from a raw form to a standardized form.

6. The computer-implemented method of claim 5, wherein the standardization rules are determined based on external knowledge of a subject matter area independent of analysis of particular raw data to be indexed.

7. An apparatus for automatically generating an index structure in a database system, said apparatus comprising:
   a conversion module, executed by a microprocessor, operative to receive raw data and to convert said raw data to standardized data in a standardized format of a first form different than the raw data form, wherein the standardized data comprises a plurality of data objects in the first form, wherein said standardized format includes information about a standardized attribute or a standardized attribute value of the data objects;
   an index generator module, executed by a microprocessor, operative to generate a plurality of index values in a second form different than the first form of the data objects, wherein each of the index values is associated with a data object, and wherein each of the index values encodes a corresponding standardized attribute or standardized attribute value of the associated data object of the index value;
   a data storage structure comprising a non-transitory computer readable storage medium, the data storage structure operative to store the plurality of index values and the plurality of data objects, wherein the index values in the second form occupy less memory of the data storage structure than would the corresponding standardized data object in the first form; and
   a search application for performing a search of one of a database and a network using said plurality of index values to locate a subset of said standardized data, said search comprising:
      receiving raw search data from a searching entity;
      processing the raw search data into standardized search data that includes information about an attribute or attribute value;
      retrieving the subset of the standardized data using the plurality of index values; and
      providing a representation of the subset of the standardized data to said searching entity.

8. The apparatus of claim 7, wherein the each of the plurality of index values comprises an integer.

9. The apparatus of claim 7, wherein the standardized data includes information about a plurality of attributes having a hierarchical structure, and wherein the plurality of index values encodes the hierarchical structure of the plurality of attributes.

10. The apparatus of claim 7, wherein the raw data comprises one of a product and service or parts list.

11. The apparatus of claim 7, wherein the conversion module is operative to categorize the standardized data into a plurality of categories and subcategories.

12. The apparatus of claim 7, wherein the conversion module is operative to convert said raw data to said standardized data using standardization rules that are determined based on external knowledge of a subject matter area independent of analysis of particular raw data to be indexed.

13. A method for use in facilitating electronic communication between first and second data systems, wherein said first data system operates in a first semantic environment corresponding to a first data form defined by at least one of linguistics and syntax, said method comprising the steps of:
   providing a computer-based processing tool operating on a computer system;
   first using said computer-based processing tool to access said communication and convert at least a first term of said communication between said first semantic environment and a second semantic environment corresponding to a second data form that is different from said first data form of said first semantic environment;
   second using said computer-based processing tool to associate a classification with one of said first term and said converted term, said classification identifying said one of said first term and said converted term as belonging to a same class as at least one other term based on a shared characteristic of said at least one other term and said one of said first term and said converted term;
   third using said classification to automatically generate an identifier based on the classification for said converted term wherein the identifier is in a third data form different than the first data form or second data form of the converted term;
   storing said identifier in the third data form in a data storage structure, wherein the converted term is indexed with respect to the identifier, wherein the identifier in the third data form occupies less memory in the data storage structure than would the converted term in the first data form or the second data form; and
   performing a search of one of a database and a network using said identifiers to locate said converted term, said performing a search comprising:
      receiving raw search data from a searching entity;
      processing the raw search data into standardized search data that includes information about an attribute or attribute value;
      retrieving the converted term using the identifier; and
      providing a representation of the converted term to said searching entity.

14. The method as set forth in claim 13, wherein said identifier comprises information associated with said classification, and wherein said classification includes a hierarchical structure.

15. The method as set forth in claim 13, wherein the communication comprises one of a product and a service or parts list.

16. The method as set forth in claim 13, wherein said identifier encodes an attribute or an attribute value of said first term.

17. The method as set forth in claim 13, wherein the second semantic environment is defined by at least one of a standardized lexicon and standardized syntax rules relating to the subject matter of said electronic communication under consideration.

18. The method as set forth in claim 13, wherein the first using step includes using conversion rules that are determined based on external knowledge of a subject matter area independent of analysis of a particular term to be converted.

* * * * *

UNITED STATES PATENT AND TRADEMARK OFFICE
CERTIFICATE OF CORRECTION

| | | |
|---|---|---|
| PATENT NO. | : 8,775,433 B2 | |
| APPLICATION NO. | : 12/580446 | |
| DATED | : July 8, 2014 | |
| INVENTOR(S) | : Alec Sharp, Luis Rivas and Mark Kreider | |

It is certified that error appears in the above-identified patent and that said Letters Patent is hereby corrected as shown below:

On the Title Page
Item 75, Inventors, delete "Edward A. Green, Englewood, CO (US)" and therefore insert the correct first named inventor --Alec Sharp, Boulder, CO (US)--.

Signed and Sealed this
Sixteenth Day of December, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,775,433 B2
APPLICATION NO. : 12/580446
DATED : July 8, 2014
INVENTOR(S) : Alec Sharp, Luis Rivas and Mark Kreider It is certified that error appears in the above-identified patent and that said Letters Patent is hereby corrected as shown below:

On the Title Page

Item 12, "Green et al." should read --Sharp et al.--.

Item 75, Inventors, delete "Edward A. Green, Englewood, CO (US)" and therefore insert the correct first named inventor --Alec Sharp, Boulder, CO (US)--.

This certificate supersedes the Certificate of Correction issued December 16, 2014.

Signed and Sealed this
Twenty-seventh Day of January, 2015

Michelle K. Lee
*Deputy Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,775,433 B2 | |
| APPLICATION NO. | : 12/580446 | |
| DATED | : July 8, 2014 | |
| INVENTOR(S) | : Green et al. | |

It is certified that error appears in the above-identified patent and that said Letters Patent is hereby corrected as shown below:

In the Specification

Column 4, line 63, delete "accordance," and insert -- accordance --, therefor.

Column 7, line 49, delete "index," and insert -- index --, therefor.

Column 7, line 55, delete "index," and insert -- index --, therefor.

Column 9, line 3, delete "an," and insert -- an --, therefor.

Column 10, line 14, delete "coffe" and insert -- coffee --, therefor.

Column 12, line 16, delete "etc)" and insert -- etc.) --, therefor.

Column 13, line 62, delete "event;" and insert -- event, --, therefor.

Column 14, line 59, delete "one," and insert -- one --, therefor.

Column 17, line 48, delete "into," and insert -- into --, therefor.

Column 20, line 54, delete "(uom)," and insert -- (uom) --, therefor.

Column 24, line 24, delete "Specifically;" and insert -- Specifically, --, therefor.

Column 24, line 45, delete "a," and insert -- a --, therefor.

Column 26, line 57, delete "above;" and insert -- above --, therefor.

Signed and Sealed this
Third Day of March, 2015

Michelle K. Lee
*Deputy Director of the United States Patent and Trademark Office*